United States Patent
Jimichi et al.

(10) Patent No.: US 8,953,345 B2
(45) Date of Patent: Feb. 10, 2015

(54) POWER CONVERTER DEVICE AND DRIVING METHOD THEREOF

(75) Inventors: Takushi Jimichi, Tokyo (JP); Satoshi Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 340 days.

(21) Appl. No.: 13/503,675

(22) PCT Filed: May 26, 2010

(86) PCT No.: PCT/JP2010/058900
§ 371 (c)(1), (2), (4) Date: Apr. 24, 2012

(87) PCT Pub. No.: WO2011/077767
PCT Pub. Date: Jun. 30, 2011

(65) Prior Publication Data
US 2012/0218800 A1  Aug. 30, 2012

(30) Foreign Application Priority Data
Dec. 24, 2009 (JP) .................................. 2009-292564

(51) Int. Cl.
H02M 5/458 (2006.01)
H02M 7/538 (2007.01)

(52) U.S. Cl.
CPC ................................. *H02M 7/53803* (2013.01)
USPC .......................................................... 363/37

(58) Field of Classification Search
CPC ...... H02M 5/458; H02M 5/4585; H02J 9/062
USPC .......................... 363/15–17, 34, 37, 131, 132
See application file for complete search history.

(56) References Cited

U.S. PATENT DOCUMENTS

| 7,791,308 B2 * | 9/2010 | Kitabatake et al. ........... 318/801 |
| 2003/0169611 A1 | 9/2003 | Nishizawa et al. |
| 2009/0052209 A1 * | 2/2009 | Kaitani et al. .................. 363/37 |

FOREIGN PATENT DOCUMENTS

| JP | 6 351255 | 12/1994 |
| JP | 9 163753 | 6/1997 |

(Continued)

OTHER PUBLICATIONS

Office Action issued Jul. 29, 2013, in Korean Patent Application No. 2012-7016107 with English translation.
Jong-Woo Choi, et al., "Inverter Output Voltage Synthesis Using Novel Dead Time Compensation", IEEE Transactions on Power Electronics, vol. 11, No. 2, Mar. 1996, pp. 221-227.
T. P. Chow, et al., "Recent Advances in high-Voltage SiC Power Devices", IEEE,0-7803-4437-5,1998, pp. 55-67.

(Continued)

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A leg includes: two semiconductor device groups connected in series and a division current is generated in a current which flows in the semiconductor device group between elements in the semiconductor device groups, a current sensor which detects a current which flows in the semiconductor device group, a voltage command generation unit which calculates a voltage command value to be outputted, a voltage drop calculating unit which calculates a voltage drop of the semiconductor device group by using a current value which is detected by the current sensor and voltage drop characteristics including a division characteristic of the semiconductor device group, and a switching control unit which corrects a voltage command value which is generated by the voltage command generation unit by using the voltage drop which is calculated so as to control ON/OFF of the switching element.

20 Claims, 23 Drawing Sheets

(56) References Cited

FOREIGN PATENT DOCUMENTS

| | | |
|---|---|---|
| JP | 2001 37282 | 2/2001 |
| JP | 2008 17237 | 1/2008 |
| JP | 2008 61403 | 3/2008 |
| WO | 02 084855 | 10/2002 |

OTHER PUBLICATIONS

International Search Report Issued Aug. 24, 2010 in PCT/JP10/58900 Filed May 26, 2010.

Office Action issued May 28, 2014 in Korean Patent Application No. 10-2014-7013570 (with English language translation).

* cited by examiner

POWER CONVERTER DEVICE AND DRIVING METHOD THEREOF

TECHNICAL FIELD

This invention relates to a power converter device which converts DC power into AC power, particularly relates to an adjustable-speed motor driving device and a power converter device which is linked to a system.

BACKGROUND ART

In many cases, a power converter device is configured as follows. That is, a power converter device comprises two semiconductor device groups comprising a switching element and a freewheeling diode, wherein the switching element and the freewheeling diode are connected in parallel. The two semiconductor device groups are connected in series, a DC voltage is applied to both ends of the semiconductor device groups and an output terminal is provided at a connection point between semiconductor device groups. In the above-mentioned power converter device, when a switching element of an upper arm is an ON-state, a positive DC voltage is outputted to the output terminal, and when a switching element of a lower arm is an ON-state, a negative DC voltage is outputted to the output terminal. Consequently, ON/OFF of a switching element is controlled so as to make an average output voltage of one switching period equal to a voltage command. Ideally, an average output voltage of one switching period is equal to a voltage command. When an IGBT is used as a switching element, a current flows in either of a switching element or a freewheeling diode according to the direction of current. In the above-mentioned power converter device, a voltage drop (on-voltage) is generated in a switching element; therefore an output voltage according to a command value can not be obtained. In Patent Document 1, technology to obtain an output voltage according to a command value is indicated as follows. That is, in order to compensate the voltage drop, a current sensor is provided at an upper arm and a lower arm, respectively, and a current which flows in each arm is judged whether the current flows in a switching element or in a freewheeling diode so as to compensate the each voltage drop.

On the other hand, there is a power converter device which performs a synchronous rectification in which a MOSFET is used as a switching element, and a division current between a switching element and a freewheeling diode is used so as to reduce the loss. (for example, Patent Document 2)

PRIOR ART REFERENCES

Patent Document

Patent Document 1: National Publication of International Patent Application WO02/084855
Patent Document 2: Japanese Patent Application Laid-Open No. 2008-61403

DISCLOSURE OF THE INVENTION

Problems to be Solved by the Invention

In a power converter device using a synchronous rectification disclosed by the Patent Document 2, in some cases, a current is divided to flow in a switching element and in a freewheeling diode. Therefore, unlike the Patent Document 1, the voltage drop can not be compensated by judging whether the current flows in a switching element or in a freewheeling diode.

Then, this invention aims to provide a power converter device in which a current is divided to flow in a plural semiconductor elements, the voltage drop in the semiconductor elements can be compensated and an output voltage with high accuracy can be obtained.

Means for Solving the Problems

A power converter device which is configured such that in a leg comprising two semiconductor device groups which are connected in series, and the semiconductor device group comprises a switching element and a semiconductor device other than a switching element which are connected in parallel, a connecting point to which semiconductor device groups are connected in series is an AC output terminal, and both ends of the legs are DC terminals, and a division current is generated in a current which flows in the semiconductor device group between elements in the semiconductor device group, and a current sensor which detects a current which flows in a semiconductor device group, a voltage command generation unit which calculates a voltage command value to be outputted, a voltage drop calculating unit which calculates a voltage drop of a semiconductor device group by using a current value which is detected by the current sensor and a voltage drop characteristics including a division characteristic of a semiconductor device, and a switching control unit which corrects a voltage command value which is generated by the voltage command generation unit by using the voltage drop which is calculated by the voltage drop calculating unit so as to control ON/OFF of a switching element are provided.

Advantage of the Invention

In a power converter device in which the current is divided to flow in a plurality of semiconductor elements, an error voltage, which is generated between a voltage command and an output voltage, and is caused by a voltage drop in a semiconductor device, is compensated and an output voltage with high accuracy can be obtained.

EMBODIMENTS FOR CARRYING OUT THE INVENTION

Embodiment 1

Figure 1:
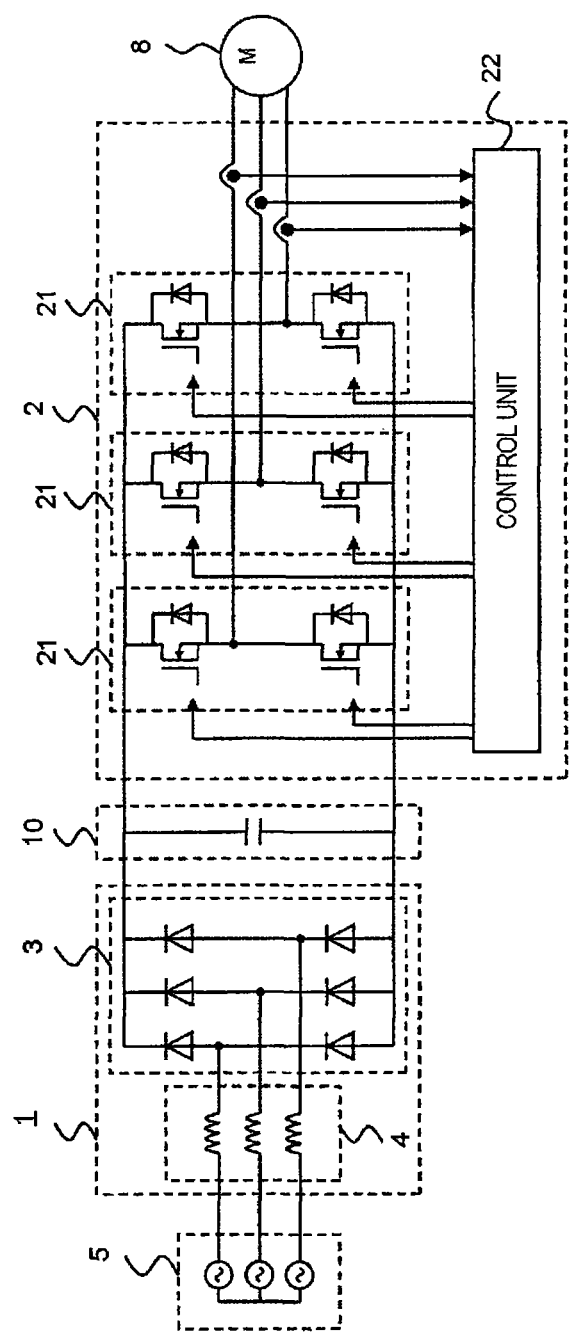
FIG. 1 is a circuit diagram showing an example of configuration of a power unit to which a power converter device according to Embodiment 1 of the present invention is applied.

FIG. 1 is a diagram showing a circuit of a power unit to which the present invention is applied. FIG. 1 is a circuit diagram in a case where a power converter device of the present invention is applied to an adjustable-speed motor driving device as an example of a power unit. The power unit is divided broadly into an input-side converter 1 and an output-side converter 2, and both of the input-side converter 1 and the output-side converter 2 are commonly connected to a DC section 10. The input-side converter 1 is mainly comprised of a diode rectifier 3 and an AC reactor 4, and is connected to an electric power system 5. The diode rectifier 3 is comprised of PiN diodes, whose rated voltage is higher than a DC voltage, or of Schottky barrier diodes, and the diode rectifier 3 converts an AC system voltage to a DC voltage.

On the other hand, as the output-side converter 2, a semiconductor group comprising a switching element and a freewheeling diode, which is a semiconductor element other than the switching element, which are connected in parallel, is used, and more than one leg 21, which is the semiconductor device groups are connected in series, is used depending on necessary number of phases of output. Both ends of each leg 21 are connected to the DC section 10 in common, at a middle point of the leg 21, that is, at a connection point of a semiconductor device group, an AC output terminal which is connected to a motor 8 is provided. In a case of three-phase motor driving, three legs 21 are used, in total; six semiconductor device groups are used. Further, a control unit 22 which controls the motor 8 is provided, and the control unit 22 finally controls ON/OFF of switching elements in semiconductor device groups. Further, in the present invention, the output-side converter 2 is a power converter device which is an object of the invention.

Figure 2:
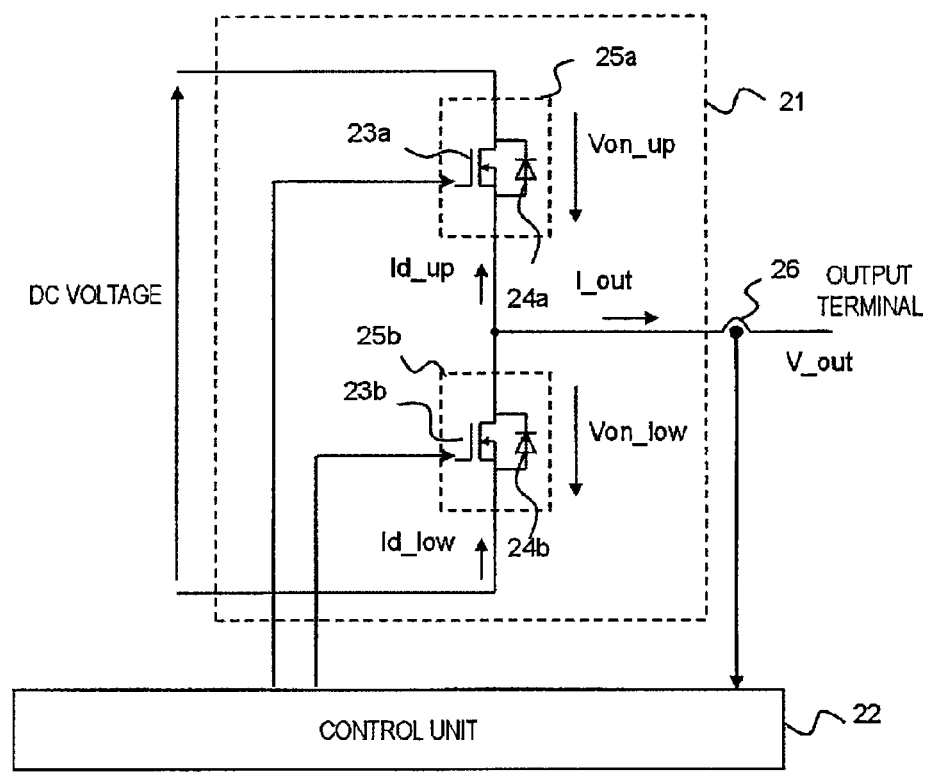
FIG. 2 is a circuit diagram showing a main circuit (leg) of a power converter device according to Embodiment 1 of the present invention.

FIG. 2 is a diagram in which one phase portion of leg 21 is focused, and describing the details of the output-side converter 2. The output-side converter 2 comprises a main circuit unit 21 which is a leg and the control unit 22. In the main circuit unit 21, when an upper arm is explained as an example, one set of semiconductor device group 25a comprises a switching element 23a and a freewheeling diode 24a, and the switching element 23a and the freewheeling diode 24a are connected in parallel. In EMBODIMENT 1, the switching element 23a is one or more MOSFETs, and the freewheeling diode 24a is a parasitic diode of the MOSFET. Therefore, the semiconductor device group 25a comprises the MOSFET 23a and the parasitic diode of the MOSFET 24a. FIG. 2 shows an example having only one MOSFET, however in a case where the amount of current is large, a plurality of MOSFETs may be connected in parallel, in a case where a voltage is high, a plurality of MOSFETs may be connected in series, and both of them may be used concurrently. A semiconductor device group 25b is configured in the same way as that of the semiconductor device group 25a. Reference numeral 26 indicates a current sensor and is used for detecting the direction and an amount of an output current, for example, a current sensor in which a hole sensor, etc. is used can be used.

On the other hand, the final objective of the control unit 22 is to control a torque or a number of rotations, etc of a motor which is connected to an output terminal. In order to perform the final objective, the control unit 22 controls ON/OFF of the switching element 23a and 23b, and controls an average voltage of the output voltage V_out in a switching period.

Figure 3:
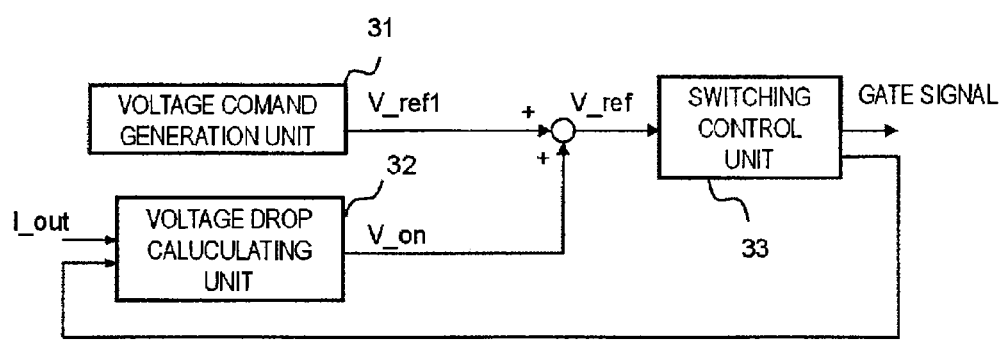
FIG. 3 is a block diagram showing a control unit of a power converter device according to Embodiment 1 of the present invention.

In order to describe the control unit 22 in more detail, in FIG. 3, a block diagram of the control unit 22 is shown. The control unit 22 mainly comprises a voltage command generation unit 31 which calculates a voltage command value for controlling the speed of a motor and the torque, a voltage drop calculating unit 32 which calculates a voltage drop of a semiconductor device group and a switching control unit 33. The voltage command generation unit 31 can easily generate the voltage command V_ref1 by using well-know technology including a vector control and a V/f constant control which have been commonly used. For example, in a case where a motor having a rated speed of 1,800 rpm, a rated frequency of 60 Hz and a rated voltage (line voltage) of 200V is driven, when the motor is controlled to be 900 rpm, which is the half of the rated speed, by using a V/f constant control, at 30 Hz, a voltage, which is made by phase voltage converting 100V, which is half of the rated voltage, is given as the voltage command V_ref1.

Figure 4:
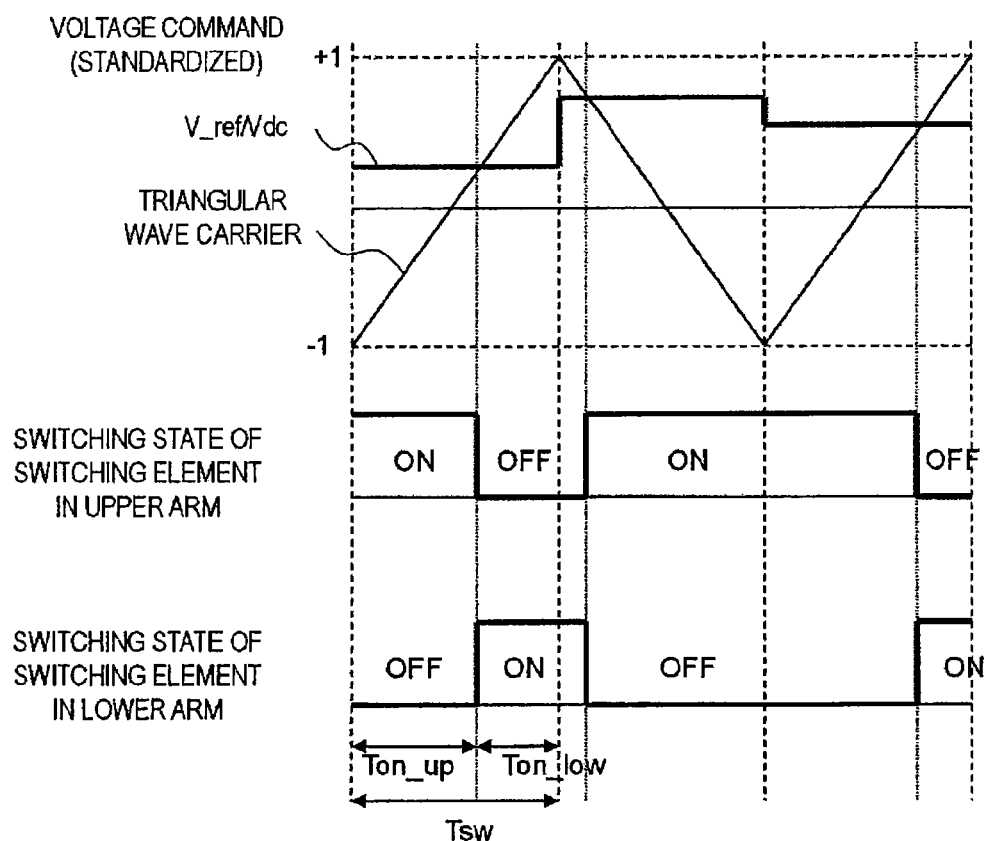
FIG. 4 is a sequence diagram showing the operation of a power converter device according to Embodiment 1 of the present invention.

In the switching control unit 33, ON/OFF of a switching element is determined so as to make the voltage command V_ref1 which is given coincides with an average voltage of an output voltage in a switching half period. Generally, in many cases, PWM control is performed as a control, in a case of PWM control, a method in which a space vector is used, or a triangular wave carrier comparison method is used, here, a triangular wave carrier comparison method as shown in FIG. 4 is described as an example.

A middle point of a DC section is conceived as a reference potential of a virtual phase voltage, and a DC voltage is set as ±Vdc (a voltage between both ends of a leg is 2 Vdc). Maximum value and minimum value of a triangular wave carrier shown in FIG. 4 is +1, and −1, respectively. Standardization is performed by dividing the voltage command V_ref which is given to the switching control unit 33 by Vdc so as to calculate the command value signal V_ref/Vdc. The command value signal V_ref/Vdc which is standardized and a triangular wave carrier are compared, when the command value signal is larger than the triangular wave carrier, a switching element of an upper arm is an ON-state and a switching element of a lower arm is an OFF-state. In reverse, when the command value signal is smaller than the triangular wave carrier, a switching element of an upper arm is an OFF-state and a switching element of a lower arm is an ON-state. By performing the control as above-mentioned, ideally, the output voltage average value V_out in a switching half period Tsw equals to the voltage command V_ref.

However, in the voltage command generation unit 31, the voltage command value V_ref1 is determined without regard for a voltage drop which is generated in a semiconductor device group. Therefore, in a case where the switching control unit 33 determines the ON/OFF time of a switching element by using the V_ref1, the actual output voltage V_out is obtained by reducing an amount of the voltage drop V_on in a semiconductor device group from the voltage command V_ref1, that is, V_out=V_ref1−V_on.

Then, the voltage drop V_on in a semiconductor device group which is generated in a certain switching half period is corrected at the next switching half period, and the V_ref is given as the V_ref1 +V_on to the switching control unit 33. The voltage drop calculating unit 32 calculates the V_on. Further, the frequency of a triangular wave carrier is, for example, 10 kHz, that is, a switching period is 100 μs, and a switching half period which is indicated by Tsw in FIG. 4 is 50 μs. Consequently, in a case where performing calculation is not in time, even if correction is performed in the next switching half period after the next or further in the next switching half period, the accuracy is not substantially decreased.

Figure 5:
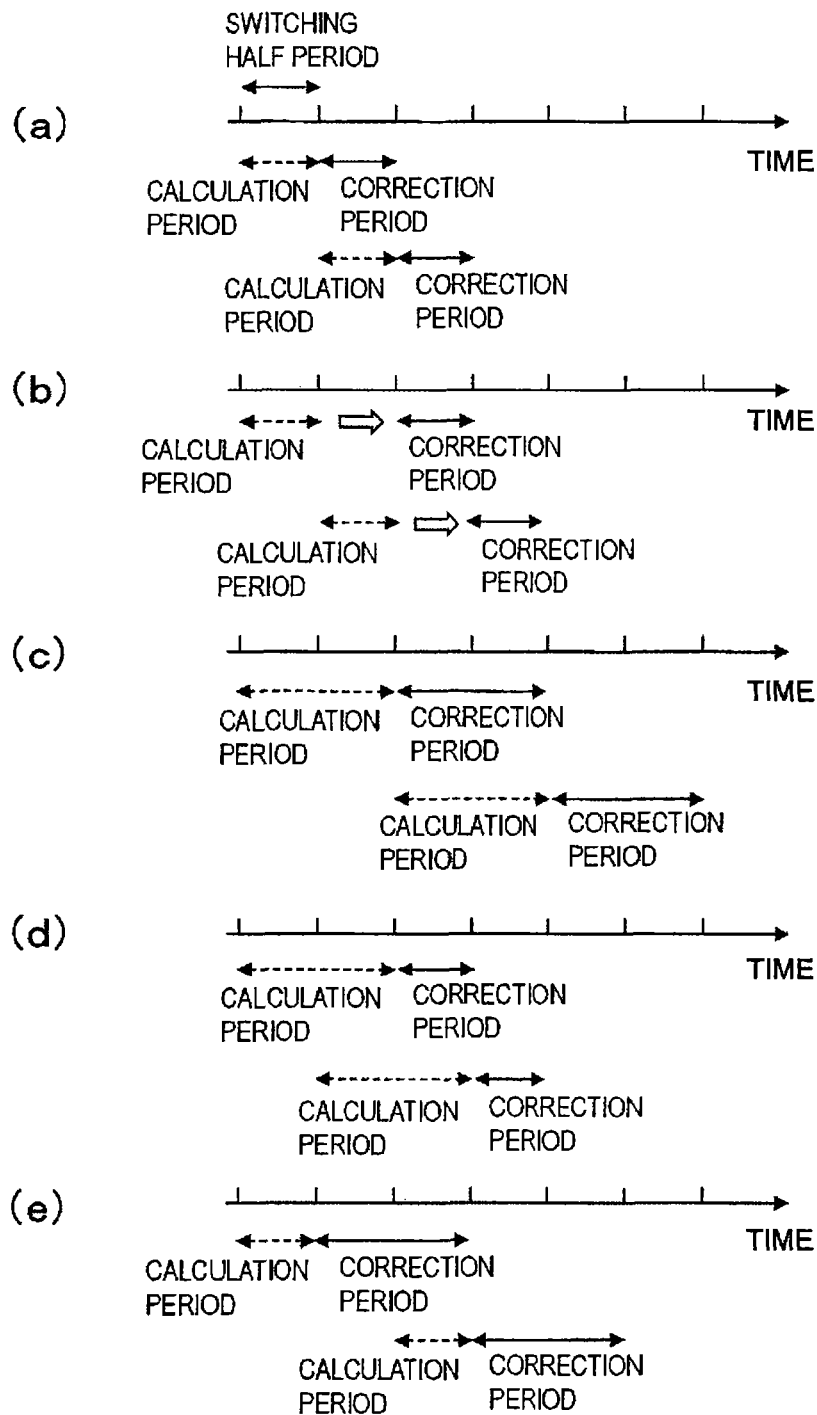
FIG. 5 is a diagram explaining the variation of a calculation period of V_on and a correction period in which a voltage command value is corrected by using the value of V_on according to Embodiment 1 of the present invention.

Further, here, the voltage drop V_on of a semiconductor device group which is generated in a certain switching half period is corrected in the next, or the next after the next switching half period, however, it is not always necessary to perform calculation and correction of a voltage drop in the half period unit, but it may perform calculation and correction of a voltage drop in the integer multiple unit of the half period. FIG. 5 shows the variation of a calculation period of the V_on and a correction period when a voltage command value is corrected by using a value of the V_on. FIG. 5(*a*) shows an example in which correction is performed in an immediate switching half period by using the V_on which is calculated in a certain switching half period as described in the above. FIG. 5(*b*) shows an example in which correction is performed in a switching half period after the next half period using the V_on which is calculated in a certain switching half period. FIG. 5(*c*) shows an example in which correction is performed in an immediate switching one period by using the V_on which is calculated in a certain switching one period. FIG. 5(*d*) shows an example in which correction is performed in an immediate switching half period by using the V_on which is calculated in a certain switching one period. FIG. 5(*e*) shows an example in which correction is performed in an immediate switching one period by using the V_on which is calculated in a certain switching half period.

That is, when an on-voltage in n times-period of switching half period (n is positive integer) including switching half period, one period, one and half periods, and two periods and so forth is corrected in m times-period of following switching half period (m is positive integer) including following switching half period, following one period, following one and half periods, and following two periods and so forth, accuracy is not substantially decreased. In a case where performing calculation is not in time, correction is not required to perform in an immediate m times-period of switching half period, correction may be performed in m times-period of a switching half period after the next half period or after next one period.

Figure 6:
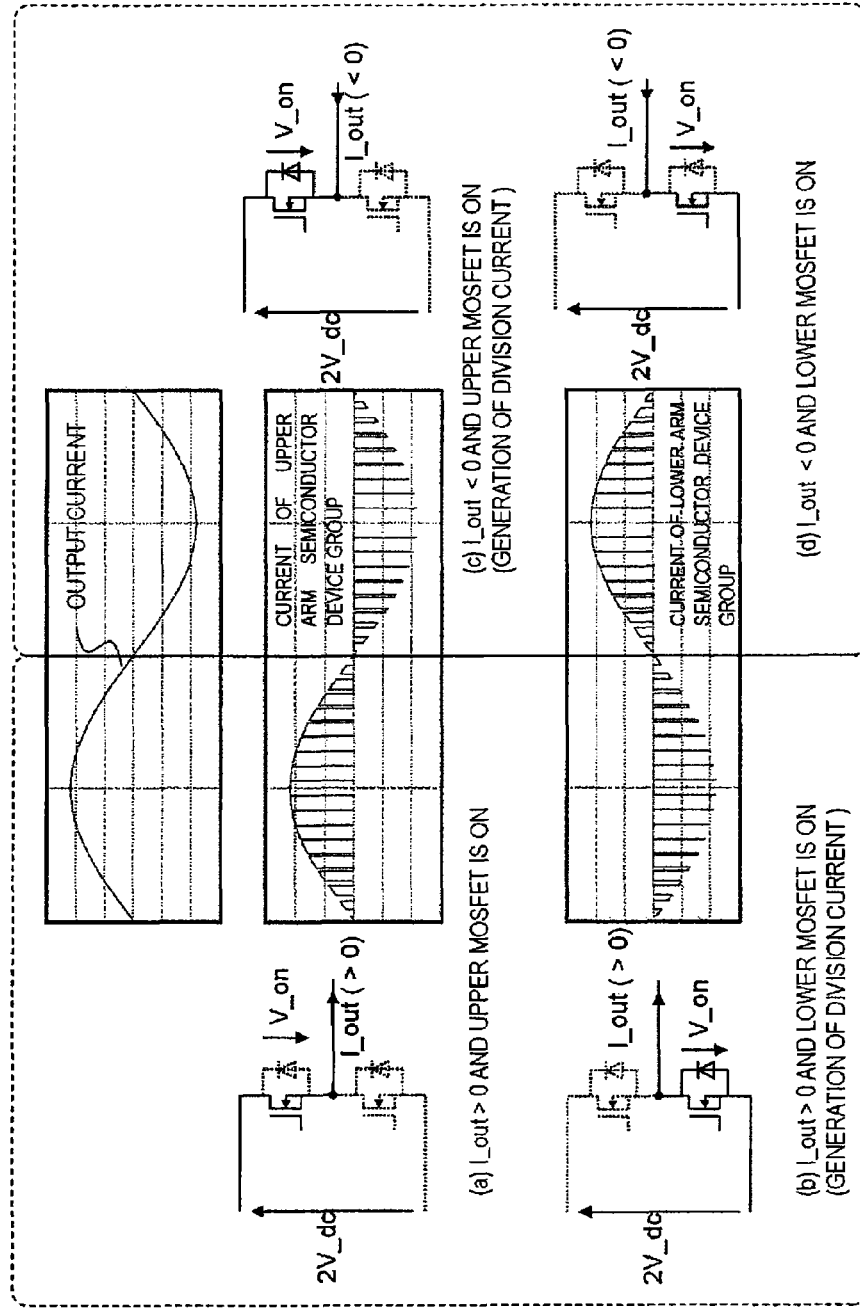
FIG. 6 is a diagram explaining the operation of each state of a power converter device according to Embodiment 1 of the present invention.

FIG. 6 is a diagram for describing one phase of a leg comprising MOSFETs and parasitic diodes of the MOSFETs and an output current path, and a diagram of current waveform of an output current I_out and a current which flows in a semiconductor device group of each arm. In FIG. 6, for example, in a case where an output current is positive and a MOSFET of an upper arm is an ON-state, (the state shown in (a)), the output current flows only in the MOSFET of an upper arm. On the other hand, in a case where an output current is positive and a MOSFET of a lower arm is an ON-state, (the state shown in (b)), the output current flows in the MOSFET of a lower arm, and a freewheeling diode which is parallel-connected to the MOSFET of a lower arm (so called, division current). In a case where an output current is negative, the state is reverse. (the state shown in (c) or (d)). Further, as shown in FIG. 6, current waveform of each semiconductor device group is waveform in which a current alternately flows in an upper element group and a lower element group. The voltage drop V_on which is generated in a semiconductor device group depends on division current characteristics. The voltage drop calculating unit 32 shown in FIG. 3 calculates above mentioned voltage drop which is generated in the semiconductor device group.

Figure 7:
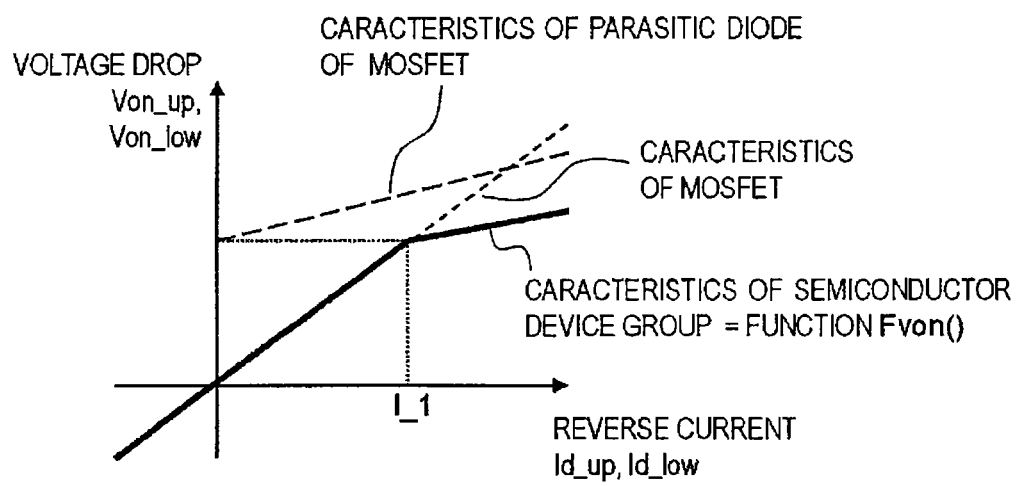
FIG. 7 is a diagram showing voltage-drop characteristics including a division current characteristic of semiconductor device group according to Embodiment 1 of the present invention.

FIG. 7 shows an example of voltage drop-current characteristics (thick solid line=function Fvon( )) of a MOSFET, a parasitic diode of the MOSFET, and of a semiconductor device group comprising the MOSFET and the parasitic diode of the MOSFET which are connected in parallel, at a certain temperature. In FIG. 7, in a case where a reverse current in a semiconductor device group which is an ON-state (=Id_up or Id_low) is I__1 or lower, a current flows only in a MOSFET, therefore a linear characteristic is shown. On the other hand, in a case where a reverse current in a semiconductor device group which is an ON-state exceeds I__1, a parasitic diode of the MOSFET is electrically conducted, a division current is generated in the MOSFET and the parasitic diode of the MOSFET, the characteristic, that is, an increase of a voltage drop with respect to current is suppressed, is shown.

That is, in a period of time while a switching element of an upper arm is an ON-state, (=Ton_up, refer to FIG. 4), the reverse current Id_up in a semiconductor device group of an upper arm is −I_out, the voltage drop Von_up in a switching element of the upper arm is obtained by Fvon(−I_out). On the other hand, in a period of time while a switching element of a lower arm is an ON-state, (=Ton_low, refer to FIG. 4) the reverse current Id_low in a semiconductor device group of the lower arm is +I_out, the voltage drop Von_low in a semiconductor device group of the lower arm is obtained by Fvon (I_out). In consideration of ON time ratio in a switching half period (=Tsw), an average value of the voltage drop V_on which is generated in a switching half period is obtained by the equation (1).

$$V\_on = -Fvon(Id\_up = -I\_out) \times (Ton\_up/Tsw) + Fvon(Id\_low = I\_out) \times (Ton\_low/Tsw) \quad (1)$$

Further, in a case where the V_on is calculated not in a switching half period, but in n times-period of switching half period including switching one period and switching one and half periods, the V_on is obtained by considering each ON time ratio in n times-period of switching half period.

Further, regarding a function Fvon( ), when the device characteristics shown in FIG. 7 are considered, by using a mathematical equation, by using a table or by using both of a mathematical equation and a table, an equivalent effect can be obtained. For example, the function Fvon( ) is obtained according to the condition of reverse current Id as follows. That is, $$\text{when } Id < I\_1, Fvon(Id) = A \times Id \quad (2)$$

$$\text{and when } Id \geq I\_1, Fvon(Id) = B \times Id + C \quad (3).$$

Constant A, B and C are determined corresponding a semiconductor device to be used.

As above-mentioned, the voltage drop calculating unit 32 calculates the voltage drop V_on which is generated in a semiconductor device group by using the output current I_out which is detected, data of ON time of each switching element in a switching half period which is received from the switching control unit 33 and the function Fvon( ). The calculated voltage drop V_on is added to the voltage command V_ref1 which is generated in the voltage command generation unit 31 so as to calculate the voltage command V_ref. The voltage command V_ref is inputted to the switching control unit 33 so as to control ON/OFF of a switching element in a semiconductor device group in the next switching half period.

By performing the above-mentioned, a voltage drop which is generated in a MOSFET and a parasitic diode of the MOSFET can be compensated. Consequently, an output voltage with high accuracy can be obtained. Further, in a motor drive device at a low speed and with high torque, that is, the state in which an output voltage is small and current is large, a voltage drop which is generated in a semiconductor device group becomes relatively large. Therefore, when the voltage drop is not compensated, a torque ripple is generated. However, according to the present invention, the torque ripple can be decreased.

Further, in the above-mentioned description, use of a semiconductor device at a certain constant temperature is assumed, however, the characteristic of a semiconductor device changes according to temperatures. Therefore, under the conditions where temperatures of a semiconductor device change intensely, a temperature sensor which detects the temperature of the semiconductor device group, or that of each semiconductor device, is attached so as to calculate a voltage drop which is generated in the semiconductor device group by using a characteristic, that is, the function Fvon( ), of the semiconductor device group at the detected temperature. By performing the above-mentioned, the accuracy is further improved.

As described in the above, by a power converter device according to EMBODIMENT 1 of the present invention, even in a case where a division current is generated in a semiconductor device group 25a and 25b, voltage correction with high accuracy can be performed. Further, unlike the Patent Document 1, without providing a current sensor which detects a current value and the direction of a current at an upper arm and a lower arm, respectively, by using only a current sensor 26 which detects an output current, by using a current value which is detected by the current sensor 26 and ON time ratio of switching elements which are provided at an upper arm and a lower arm, a voltage drop can be calculated, therefore the configuration of a power converter device is simple.

Embodiment 2

Figure 8:
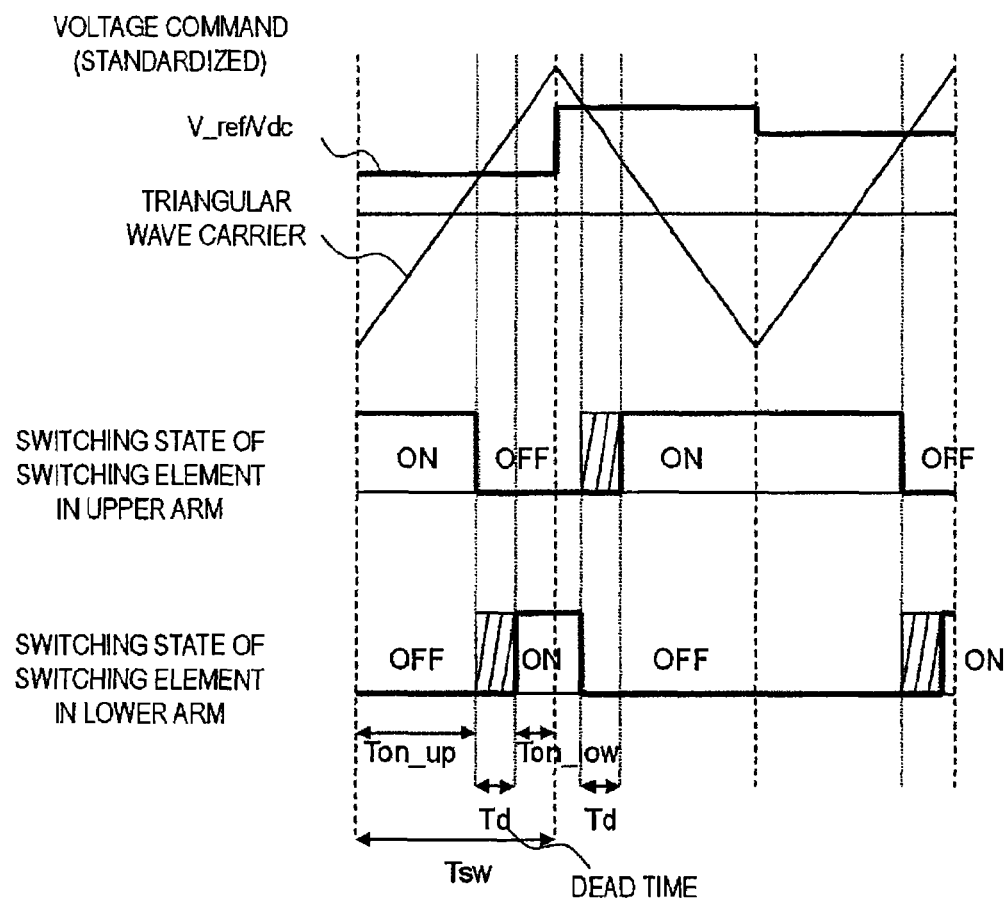
FIG. 8 is a sequence diagram explaining the operation of a power converter device according to Embodiment 2 of the present invention.

FIG. 8 is a sequence diagram showing the operation of a power converter device according to Embodiment 2 of the present invention. In EMBODIMENT 1, a case in which a period of time when both of an upper switching element and a lower switching element are OFF-state at the same time (dead-time) is extremely small and negligible is assumed, however, in a case where there is an influence of dead-time which is provided for protecting a semiconductor device group, when a current path during dead-time and a voltage drop in a semiconductor device group are incorporated, an amount of voltage drop which is generated during dead-time can be corrected. Consequently, an output voltage with higher accuracy can be obtained.

Figure 9:
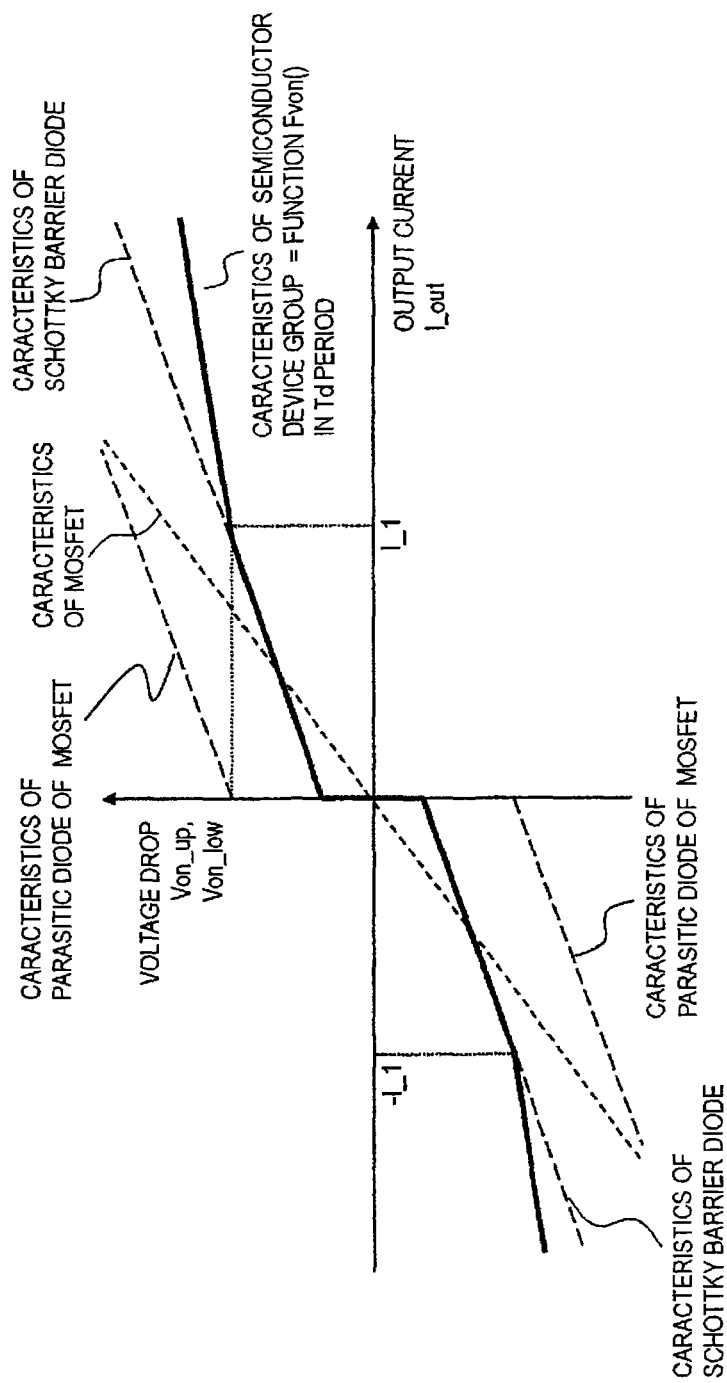
FIG. 9 is a diagram showing an example of voltage-drop characteristics including a division current characteristic of semiconductor device group in dead time according to Embodiment 2 of the present invention.

As shown in FIG. 8, the dead-time Td (a period which is indicated by diagonal line) is provided by making the time-difference between rise time at power ON of a MOSFET and that at power OFF of a MOSFET for preventing short circuit so as to protect a semiconductor device group. During the Td period, a MOSFET is an OFF-state; therefore a voltage drop during the Td period is only generated in a diode. Consequently, in a case where the Td is large, an error is generated between a voltage drop which is generated during the Td period and a voltage drop correction amount which is calculated assuming that a current flows also in a MOSFET by ignoring the Td period. In this case, a voltage drop correction amount is obtained by considering the semiconductor device group characteristic during the Td period as shown in FIG. 9, that is, a current does not flow in a MOSFET during the Td period.

Concretely, a correction amount of a voltage drop is obtained as follows. FIG. 9 shows the semiconductor device group characteristic during the Td period, that is, the function Fvon_td( ). When a current I_out is positive, the current flows in a diode of a lower arm and when the current I_out is negative, the current flows in a diode of an upper arm. Further in a case where more than two diodes are connected in parallel, such as a case where a Schottky barrier diode in addition to a parasitic diode of the MOSFET are connected in parallel, which will be described in EMBODIMENT 4 later, for example, when an output current is I_1 or lower, a current only flows in the Schottky barrier diode, when an output current is I_1 or higher, a current also flows in the parasitic diode of the MOSFET, therefore a division current is generated. The characteristic in which the above-mentioned is considered is the characteristic of a semiconductor device group Fvon_td( ) during the Td period shown in FIG. 9. Then, by using the function Fvon_td( ) and the semiconductor device group characteristic Fvon( ) in a period other than the Td period, an average value of a voltage drop in a switching half period is obtained by the equation (5).

$$V\_on = Fvon\_td(I\_out) \times (Td/Tsw) - \\ Fvon(Id\_up = -I\_out) \times (Ton\_up/Tsw) + \\ Fvon(Id\_low = I\_out) \times (Ton\_low/Tsw) \quad (5)$$

Consequently, as above-mentioned, a correction amount of the V_on can be obtained.

Embodiment 3

Figure 10:
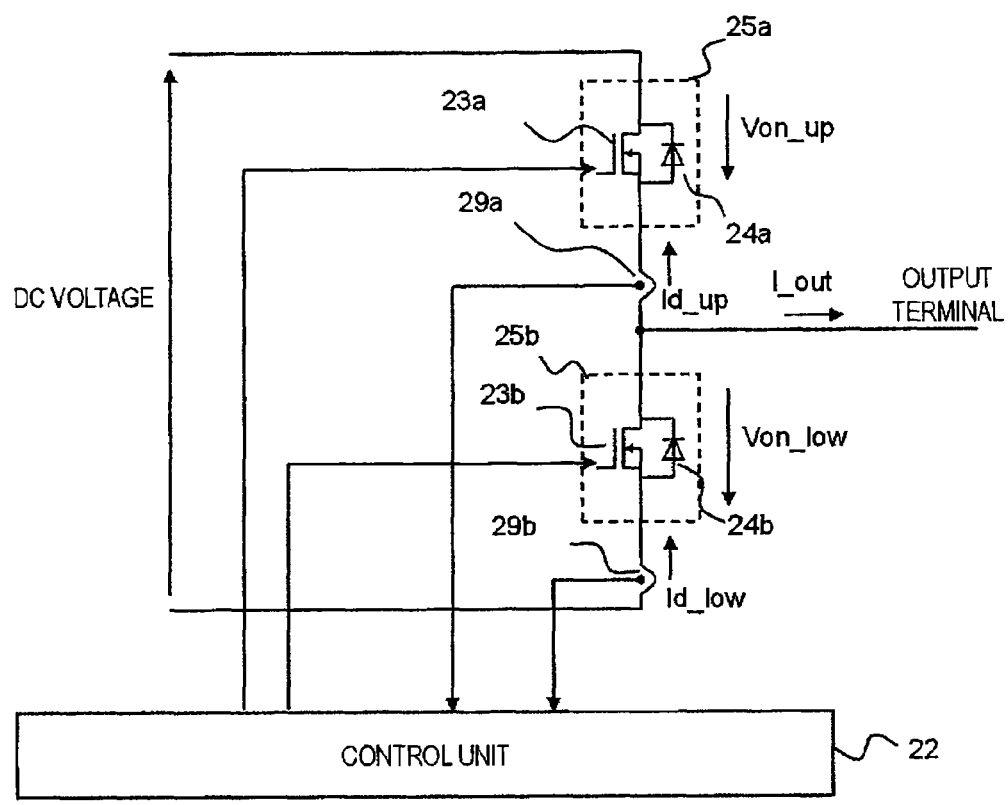
FIG. 10 is a circuit diagram showing a main circuit (leg) of a power converter device according to Embodiment 3 of the present invention.

FIG. 10 is a diagram showing a main circuit (leg) of a power converter device according to Embodiment 3 of the present invention. In EMBODIMENT 1, a current sensor 26 is provided so as to detect the output current I_out, however, in EMBODIMENT 2, as shown in FIG. 10, a current sensor 29a and a current sensor 29b are provided so as to directly detect the current Id_up which flows in a semiconductor device group of an upper arm 25a and the current Id_low which flows in a semiconductor device group of a lower arm 25b, respectively. Generally, when the output current is I_out=−Id_up+Id_low, either the Id_up or the Id_low is zero depending on the switching state, however, in a case where a leakage current when a MOSFET is in an OFF-state is not be negligible, accuracy can be improved by using the current sensor 29a and 29b as shown in FIG. 10.

Figure 11:
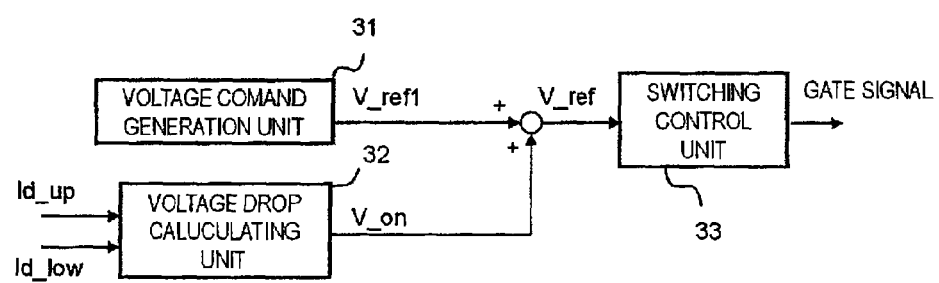
FIG. 11 is a block diagram showing a control unit of a power converter device according to Embodiment 3 of the present invention.

In this case, as a current value of a current which flows in an upper arm and a lower arm, the current Id_up and the current Id_low can be detected separately. Here, in order to obtain the V_on, not the output current I_out but the current Id_up and the current Id_low which are detected are used. The detected current Id_up and Id_low are current values which are weighted according to respective ON-time ratio. Therefore, unlike the equation (1), it is not necessary to use respective ON-time ratio, by using equation $$V\_on = -Fvon(Id\_up) + Fvon(Id\_low) \quad (4),$$

an average value of the V_on can be obtained. Consequently, in a voltage drop calculating unit 32 in a control unit 22 in EMBODIMENT 3, as shown in FIG. 11, it is not necessary to receive the data regarding ON-time from a switching control unit 33.

As above described, according to a power converter device in Embodiment 3, even in a case where a division current is generated in a semiconductor device group 25a and 25b, voltage correction with high accuracy can be performed. Further, unlike the Patent Document 1, without judging whether a current flows in a switching element or in a freewheeling diode of each upper arm and each lower arm, a voltage drop can be calculated using a current value which is detected by the current sensor 29a and 29b. Consequently, the configuration of a power converter device can be simple.

Embodiment 4

Figure 12:
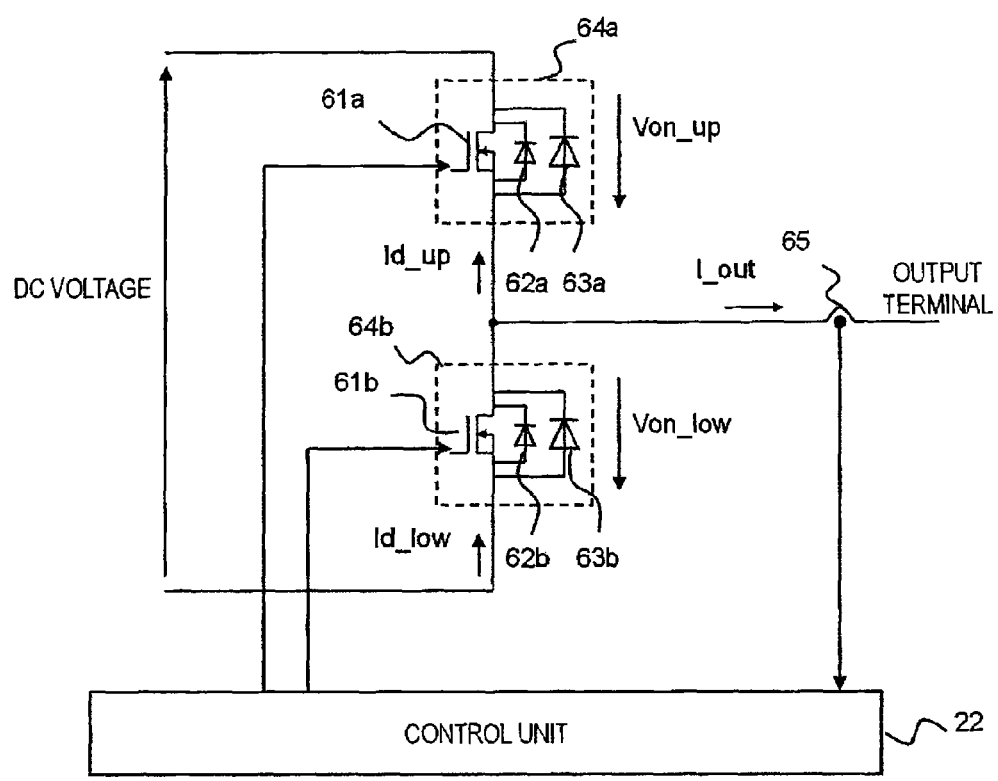
FIG. 12 is a circuit diagram showing a main circuit (leg) of a power converter device according to Embodiment 4 of the present invention.

FIG. 12 is a diagram showing a main circuit (leg) of a power converter device according to Embodiment 4 of the present invention. Basic configuration is same as that shown in FIG. 1 and FIG. 3. In EMBODIMENT 4, unlike FIG. 2 in EMBODIMENT 1, as shown in FIG. 12, when an upper arm is taken as an example, a Schottky barrier diode 63a is connected in parallel as a freewheeling diode to a MOSFET 61a of a switching element of an output-side converter 2. Also in this case, a parasitic diode 62a of a MOSFET accompanies a MOSFET's structure; therefore the parasitic diode 62a also functions as a freewheeling diode. Consequently, one set of semiconductor device group 64a comprises the MOSFET 61a, the Schottky barrier diode 63a and the parasitic diode 62a of the MOSFET. In a lower arm, one set of semiconductor device group 64b comprises in the same way as that of the semiconductor device group 64a. According to the above-mentioned configuration of a semiconductor device group, the performance of a parasitic diode of a MOSFET is not good; therefore, the semiconductor device group having the above-mentioned configuration is often used for the purpose of utilizing the performance of a Schottky barrier diode as a freewheeling diode.

In the above-mentioned configuration of a semiconductor device group, a division current path has three directions. Therefore, the configuration of a control unit 22 is the same as shown in FIG. 3, however, the following characteristic is given to the voltage drop calculating unit 32 in FIG. 3.

Figure 13:
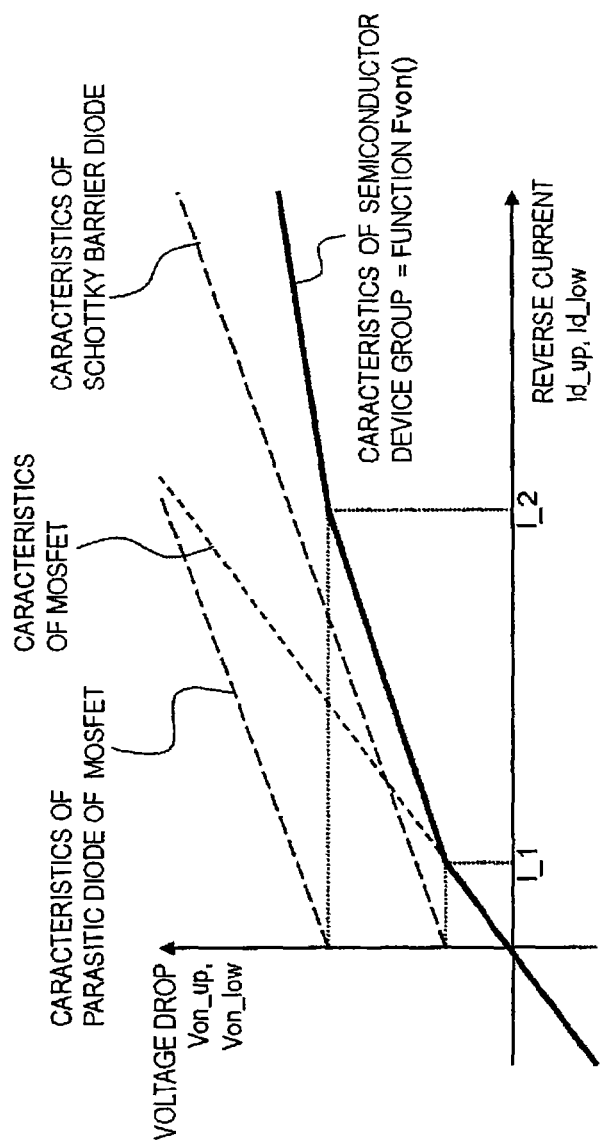
FIG. 13 is a diagram showing an example of voltage-drop characteristics including a division characteristic of semiconductor device group according to Embodiment 4 of the present invention.

FIG. 13 shows an example of voltage drop-current characteristics of a MOSFET, a Schottky barrier diode, a parasitic diode of the MOSFET, and a semiconductor device group comprising the MOSFET, the Schottky barrier diode and the parasitic diode of the MOSFET which are connected in parallel, at a certain temperature. In FIG. 13, in a case where a reverse current in a semiconductor device group which is an ON-state ((=Id_up or Id_low) is I__1 or lower, a current flows only in a MOSFET, therefore a linear characteristic is shown. On the other hand, in a case where a reverse current in a semiconductor device group which is an ON-state exceeds I__1, a Schottky barrier diode is electrically conducted, a division current is generated in the MOSFET and the Schottky barrier, and the characteristic, that is, an increase of a voltage drop with respect to a current is suppressed, is shown. Further, in a case where a reverse current in a semiconductor device group which is an ON-state exceeds I__2, a parasitic diode of the MOSFET is electrically conducted, a division current is generated in the MOSFET and the Schottky barrier diode and the parasitic diode of the MOSFET, and the characteristic, that is, an increase of a voltage drop with respect to current is further suppressed, is shown.

In the voltage drop calculating unit 32 in FIG. 3 which calculates a voltage drop in a semiconductor device group, the characteristic Fvon( ) shown in FIG. 13 is incorporated as a table, as a mathematical equation, or as both of them, and the voltage drop V_on in a semiconductor device group is outputted. Finally, the V_on is added so as to correct the voltage command V_ref1, and the V_ref which is final command is derived. Based on the V_ref, a switching control unit 33 performs the ON/OFF control of a switching element in a semiconductor device group.

In FIG. 13, an example in which a current flows in the order of a MOSFET, a Schottky barrier diode, and a parasitic diode of a MOSFET with respect to increase of reverse current, however, the order is not limited to the above, and there are some cases in which the order is different depending on individual characteristics.

As above-mentioned, even in a case where a Schottky barrier diode is used as a freewheeling diode, according to EMBODIMENT 4, a voltage drop which is generated in a MOSFET, a Schottky barrier diode and a parasitic diode of the MOSFET is corrected. Consequently, an output voltage with high accuracy can be obtained, and a torque ripple can be decreased.

In the above description, a MOSFET, a parasitic diode of the MOSFET and a Schottky barrier diode are used in a semiconductor device group, however, when a PiN diode is used instead of the Schottky barrier diode, by considering a PiN diode characteristic in the same way as the characteristic shown in FIG. 13, same effect can be obtained.

When there is an influence of dead-time, as described in EMBODIMENT 2, by incorporating a current path and the voltage drop characteristics in a semiconductor device group, an amount of a voltage drop which is generated in dead-time can be corrected. Consequently, an output voltage with higher accuracy can be obtained in EMBODIMENT 4.

Figure 14:
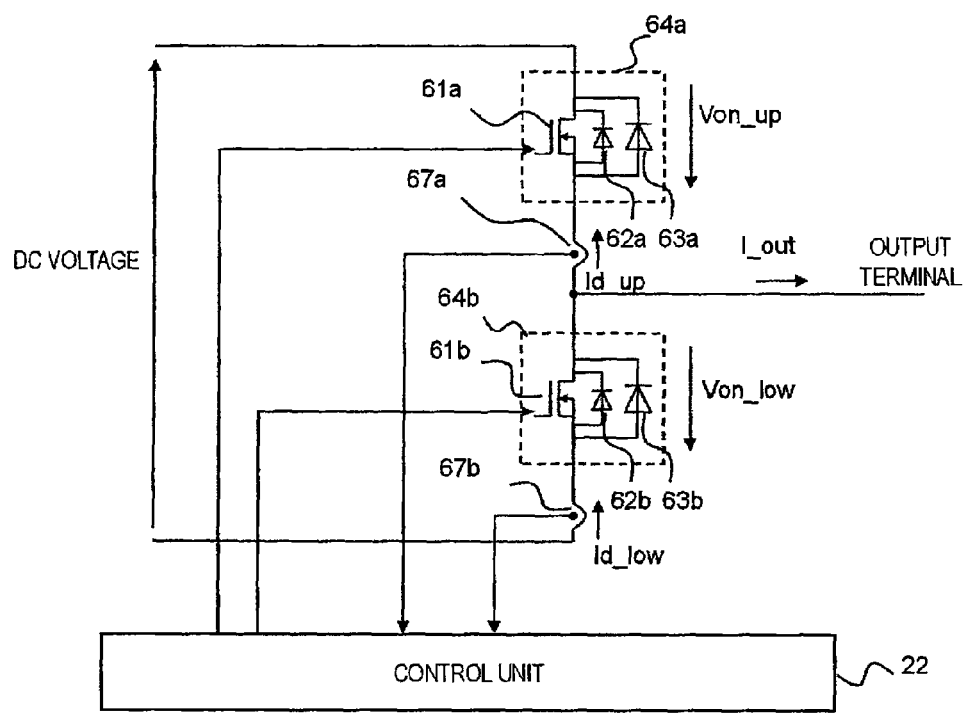
FIG. 14 is a circuit diagram showing a main circuit (leg) of another power converter device according to Embodiment 4 of the present invention.

In the above-mentioned, a current sensor 65 is provided so as to detect the output current I_out, however, in the same way as the description of EMBODIMENT 3, as shown in FIG. 14, a current sensor 67a and a current sensor 67b may be provided so as directly detect the current Id_up which flows in a semiconductor device group 64a of an upper arm and the current Id_low which flows in a semiconductor device group 64b of a lower arm, respectively. Generally, when the output current is I_out=-Id_up+Id_low, either the Id_up or the Id_low is zero depending on the switching state, however, in a case where a leakage current when a MOSFET is an OFF-state is not be negligible, accuracy can be improved by using the current sensor 67a and 67b as shown in FIG. 14.

Further, in the same way as that described in EMBODIMENT 1, under the conditions where temperatures of a semiconductor device change intensely, a temperature sensor which detects the temperature of the semiconductor device group, or that of each semiconductor device, is attached so as to calculate a voltage drop which is generated in the semiconductor device group by using the characteristic of the semiconductor device group, that is, the function Fvon( ) at the detected temperature. By performing the above-mentioned, the accuracy is further improved.

Embodiment 5

Figure 15:
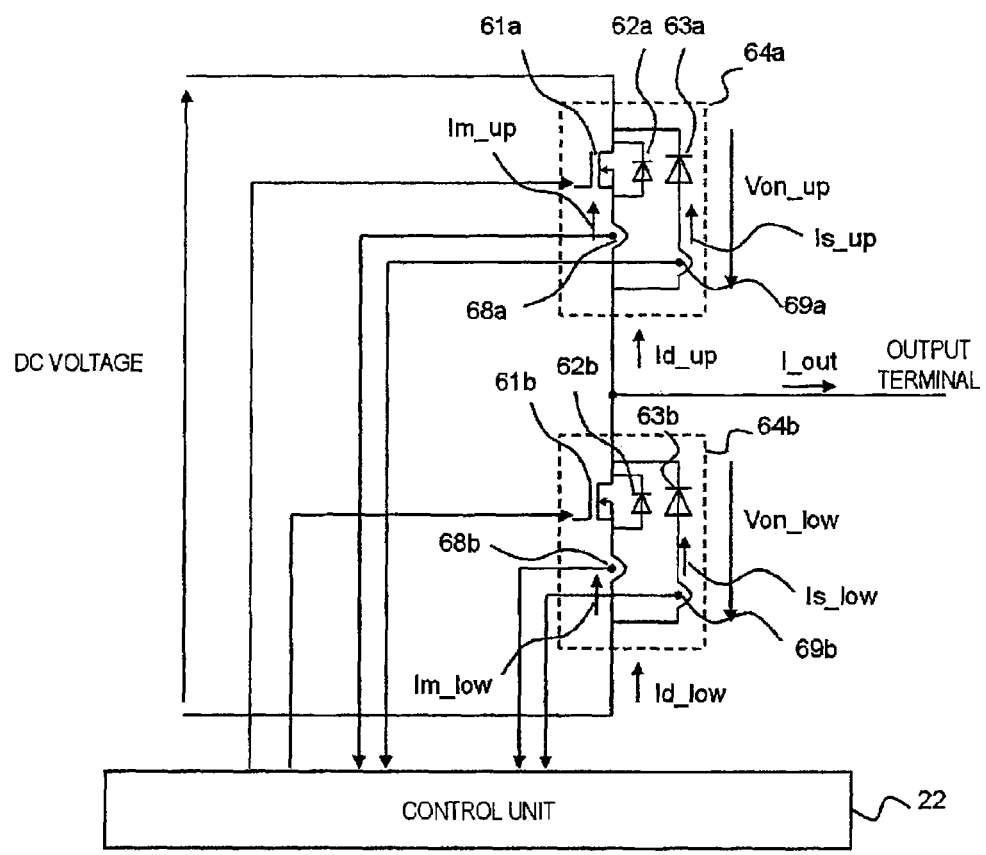
FIG. 15 is a circuit diagram showing a main circuit (leg) of a power converter device according to Embodiment 5 of the present invention.

FIG. 15 is a diagram showing a main circuit (leg) of a power converter device according to Embodiment 5 of the present invention. In EMBODIMENT 4, a current sensor 26 is provided so as to detect the output current I_out, or Id_up, Id_low of each upper arm or each lower arm, however, in EMBODIMENT 5, as shown in FIG. 15, in order to directly detect a current which flows in each semiconductor device including MOSFETs constituting a semiconductor device group 64a and 64b, and freewheeling diodes, current sensors 68a and 68b which detect magnitudes and directions of the current Im which flow in MOSFETs 61a and 61b which are switching elements, and a parasitic diode 62a and 62b of the MOSFETs, and a current sensor 69a and 69b which detect magnitudes and directions of the current Is of Schottky barrier diodes 63a and 63b are provided.

Figure 16:
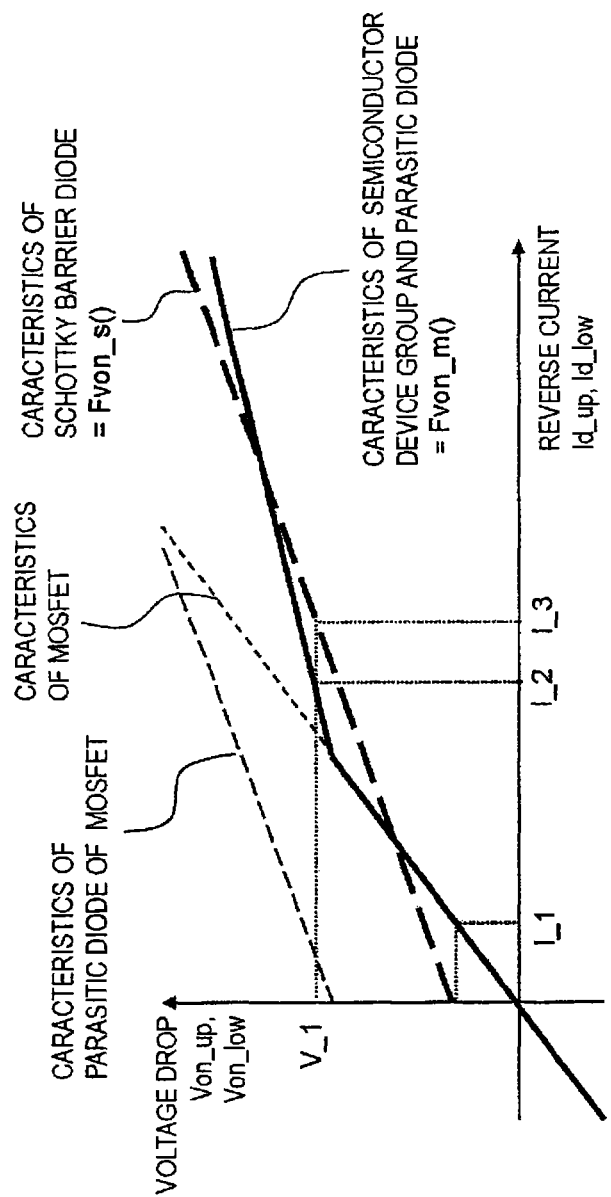
FIG. 16 is a diagram showing an example of voltage-drop characteristics including a division current characteristic of semiconductor device group according to Embodiment 5 of the present invention.

Calculation of correction value of a voltage drop in this case is described referring FIG. 16. An upper arm is focused. A current sensor 68a detects the current Im_up which flows in a semiconductor device group including the MOSFET 61a and the parasitic diode 62a of the MOSFET. Consequently, by the current which is detected by the current sensor 68a, a voltage drop which is generated in the semiconductor device group including the MOSFET 61a and the parasitic diode 62a of the MOSFET is obtained by the semiconductor device group characteristic Fvon_m( ) including a MOSFET and a parasitic diode indicated by a solid line in FIG. 16. Further, the current sensor 69a detects the current Is_up which flows in the Schottky barrier diode 63a. Consequently, by the current which is detected by the current sensor 69a, a voltage drop which is generated in the Schottky barrier diode 63a is obtained by the Schottky barrier diode characteristic Fvon_s( ) indicated by a solid line in FIG. 16.

As can be seen in FIG. 16, when the total current Id_up of an upper arm is I_1 or lower, a division current which flows in the Schottky barrier diode 63a is not generated, and the current which is detected by the current sensor 69a is zero. At this time, Im_up is I_1 or lower, and the voltage drop Von_up is obtained by a value of the current Im_up which is detected by the current sensor 68a and Fvon_m( ) shown in FIG. 16. When Id_up is I_1 or higher, a division current which flows in the Schottky barrier diode 63a is generated. At this time, a division current which flows in the Schottky barrier diode 63a is generated so as to make a voltage drop in the Schottky barrier diode 63a and a voltage drop which is generated in the semiconductor group of the MOSFET 61a and the parasitic diode 62a same. When the current Im_up which flows in a semiconductor device group including the MOSFET 61a and the parasitic diode 62a is I_2, and the current Is_up which flows in the Schottky barrier diode 63a is I_3, as shown by the voltage drop V_1 in FIG. 16, both of them generate the same voltage drop V_1. As above-mentioned, a division current is generated in such a way that Id_up=I_2+I_3. At this time, a voltage drop in the semiconductor device group 64a of an upper arm comprising the MOSFET 61a, the parasitic diode 62a of the MOSFET and the Schottky barrier diode 63a can be obtained by Fvon_m( ) using a value of Im_up which is detected by the current sensor 68a, also can be obtained by Fvon_s( ) using a value of Is_up which is detected by the current sensor 69a. Values of a voltage drop which are obtained by the above-mentioned cases are same.

For example, in a case where the characteristic of a parasitic diode of a MOSFET can not be accurately expressed by a function or a table, when the current is I_1 or lower, the function Fvon_m( ) of a MOSFET characteristic is adopted, and when the current is I_1 or higher, the function Fvon_s( ) of a Schottky barrier diode is adopted. By performing the above, ON voltage can be corrected with higher accuracy than the case which is described in EMBODIMENT 4.

Embodiment 6

Figure 17:
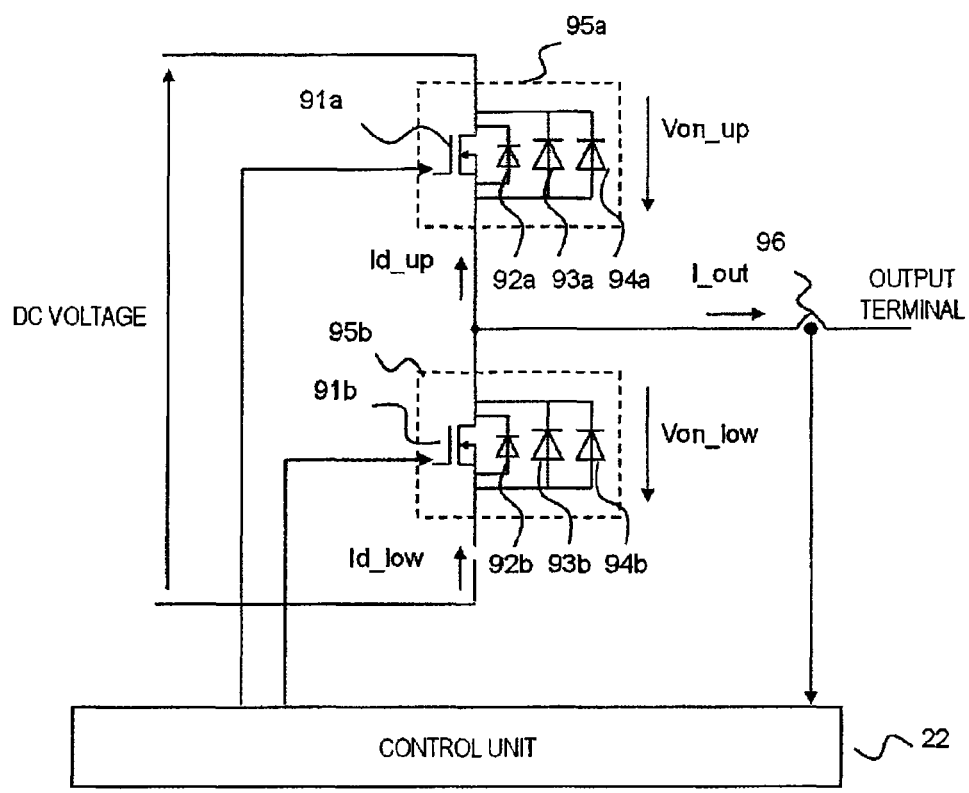
FIG. 17 is a circuit diagram showing a main circuit (leg) of a power converter device according to Embodiment 6 of the present invention.

FIG. 17 is a diagram showing a main circuit (leg) of a power converter device according to Embodiment 6 of the present invention. Basic configuration is same as that shown in FIG. 1 and FIG. 3. In EMBODIMENT 6, unlike FIG. 2 in EMBODIMENT 1, as shown in FIG. 17, when an upper arm is taken as an example, a Schottky barrier diode 93a and a PiN diode 94a are connected in parallel as freewheeling diodes to a MOSFET 91a of a switching element of an output-side converter 2. Also in this case, a parasitic diode 92a of the MOSFET accompanies a MOSFET's structure; therefore the parasitic diode 92a also functions as a freewheeling diode. Consequently, one set of semiconductor device group 95a comprises the MOSFET 91a, the Schottky barrier diode 93a, the PiN diode 94a and the parasitic diode 92a of the MOSFET. In a lower arm, one set of semiconductor device group 95b comprises in the same way as that of the semiconductor device group 95a.

According to the above-mentioned configuration of a semiconductor device group, the performance of a parasitic diode of a MOSFET is not good, therefore, a package in which a PiN diode has been already connected is used, and in a case where a Schottky barrier diode is utilized in order to further improve the performance, the semiconductor device group having the above-mentioned configuration is often used. In the above-mentioned configuration of a semiconductor device group, a division current path has four directions. Therefore, the configuration of a control unit 22 is the same as that in EMBODIMENT 1, however, the following characteristic is given to a voltage drop calculating unit 32 which calculates a voltage drop in a semiconductor device group shown in FIG. 3.

Figure 18:
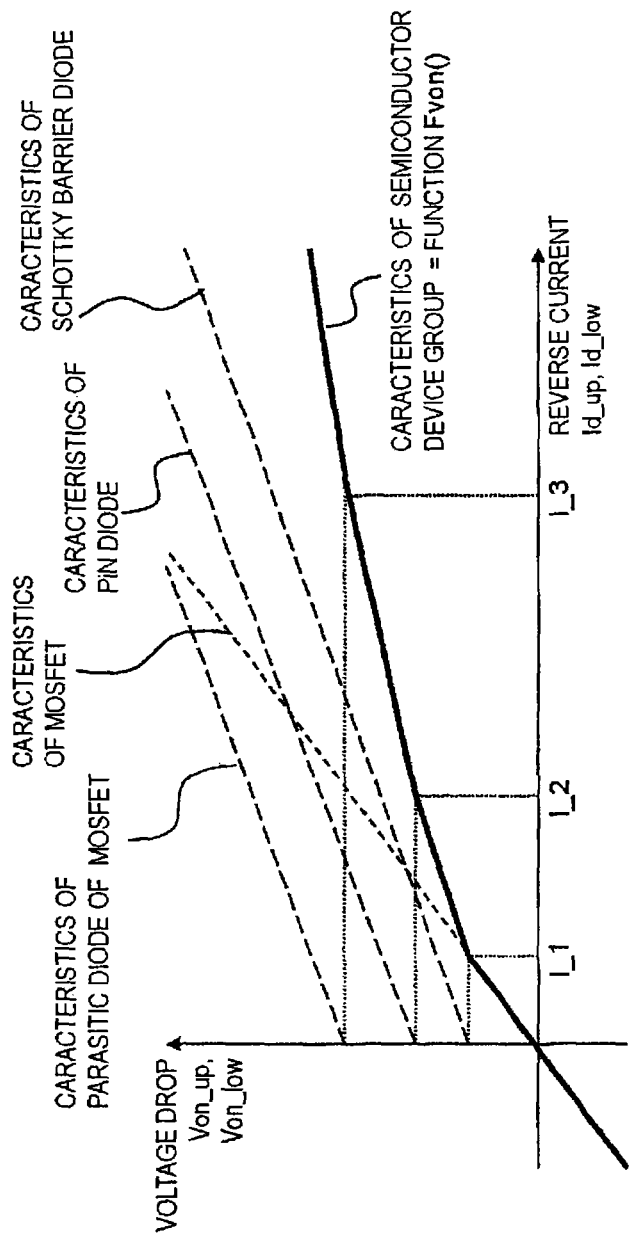
FIG. 18 is a diagram showing an example of voltage-drop characteristics including a division current characteristic of semiconductor device group according to Embodiment 6 of the present invention.

FIG. 18 shows an example of voltage drop-current characteristics of a MOSFET, a Schottky barrier diode, PiN diode, a parasitic diode of the MOSFET, and a semiconductor device group, comprising the MOSFET, the Schottky barrier diode and the parasitic diode of the MOSFET which are connected in parallel, at a certain temperature. In FIG. 18, in a case where a reverse current in a semiconductor device group which is an ON-state ((=Id_up or Id_low) is I__1 or lower, a current flows only in a MOSFET, therefore a linear characteristic is shown. On the other hand, in a case where a reverse current in a semiconductor device group which is an ON-state exceeds I__1, a Schottky barrier diode is electrically conducted, a division current is generated in the MOSFET and the Schottky barrier diode, and the characteristic, that is, an increase of a voltage drop with respect to current is suppressed, is shown. Further, in a case where a reverse current in a semiconductor device group which is an ON-state exceeds I__2, a PiN diode is electrically conducted, a division current is generated in the MOSFET, the Schottky barrier diode and the PiN diode, and the characteristic, that is, an increase of a voltage drop with respect to current is further suppressed, is shown. Further, in a case where a reverse current in a semiconductor device group which is an ON-state exceeds I__3, a parasitic diode of the MOSFET is electrically conducted, a division current is generated in the MOSFET, the Schottky barrier diode, the PiN diode and the parasitic diode of the MOSFET, and the characteristic, that is, an increase of a voltage drop with respect to current is further suppressed, is shown.

In the voltage drop calculating unit 32 in FIG. 3, the characteristic shown in FIG. 18 is incorporated as a table, as a mathematical equation, or as both of them, and the voltage drop V_on in a semiconductor device group is outputted. Finally, the V_on is added so as to correct the voltage command V_ref1, and the V_ref which is final command is derived. Based on the V_ref, a switching control unit 33 performs the ON/OFF control of a switching element in a semiconductor device group.

In FIG. 18, an example in which a current flows in the order of a MOSFET, a Schottky barrier diode, a PiN diode and a parasitic diode of a MOSFET with respect to increase of reverse current, however, the order is not limited to the above, and there are some cases in which the order is different depending on individual characteristics.

As above-mentioned, even in a case where a Schottky barrier diode and a PiN diode are used as a freewheeling diode, according to EMBODIMENT 6, a voltage drop which is generated in a MOSFET, a Schottky barrier diode and a parasitic diode of the MOSFET is corrected. Consequently, an output voltage with high accuracy can be obtained, and a torque ripple can be decreased.

When there is an influence of dead-time, as described in EMBODIMENT 2, by incorporating a current path and a voltage drop characteristics in a semiconductor device group, an amount of a voltage drop which is generated in dead-time can be corrected. Consequently, an output voltage with higher accuracy can be obtained in EMBODIMENT 6.

Figure 19:
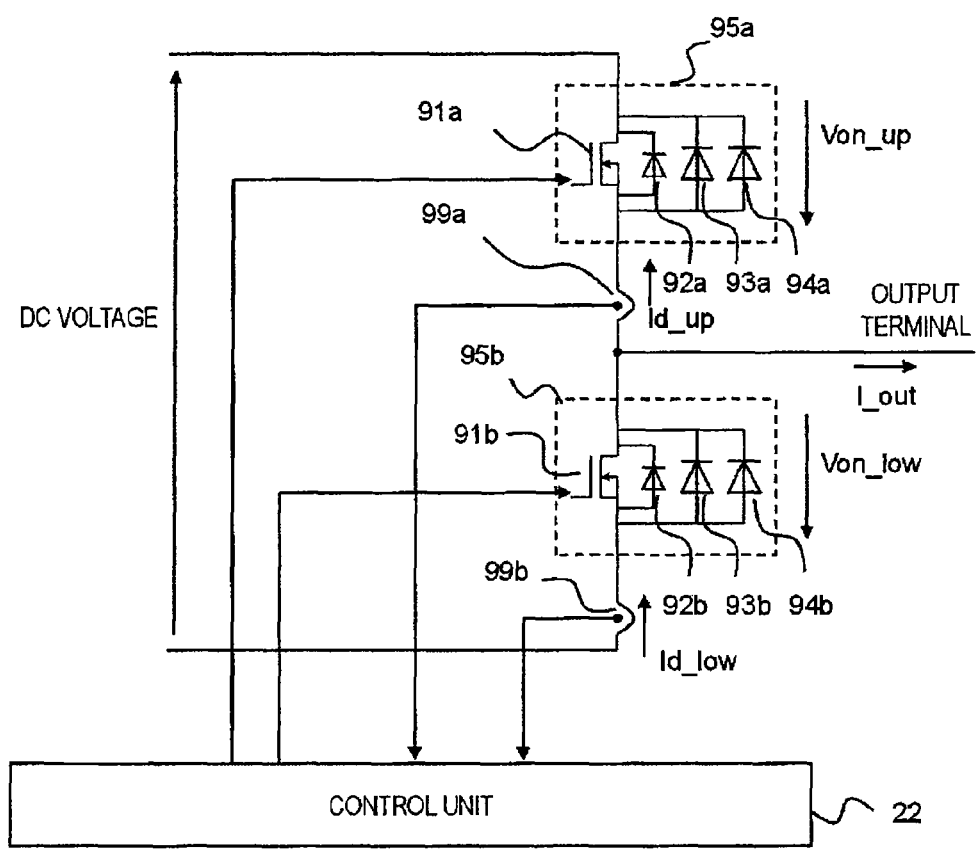
FIG. 19 is a circuit diagram showing a main circuit (leg) of another power converter device according to Embodiment 6 of the present invention.

In the above-mentioned, a current sensor is provided so as to detect the output current I_out, in the same way as the description of EMBODIMENT 3. However, as shown in FIG. 19, a current sensor 99a and a current sensor 99b may be provided so as directly detect the current Id_up which flows in a semiconductor device group 95a of an upper arm and the current Id_low which flows in a semiconductor device group 95b of a lower arm, respectively. Generally, the output current is I_out=−Id_up+Id_low and either the Id_up or the Id_low is zero. However, in a case where a leakage current when a MOSFET is an OFF-state is not be negligible, accuracy can be improved by using two current sensors as shown in FIG. 19.

Figure 20:
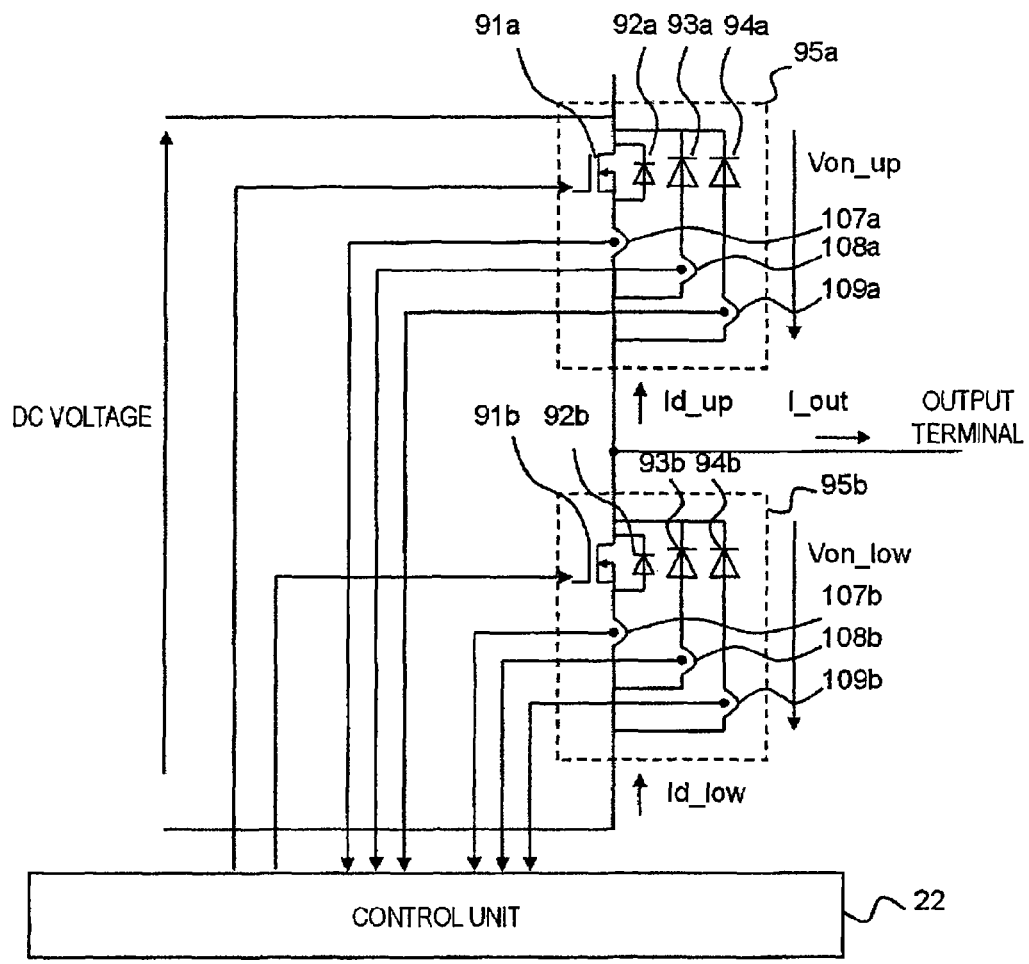
FIG. 20 is a circuit diagram showing a main circuit (leg) of another power converter device according to Embodiment 6 of the present invention.

Further, in the same way as that described in EMBODIMENT 5, as shown in FIG. 20, in order to directly detect a current which flows in each semiconductor device including a MOSFET and a freewheeling diode constituting a semiconductor device group, a current sensor 107a and 107b which detect magnitudes and directions of currents which flow in a MOSFET 91a and 91b as switching elements, and parasitic diodes 92a and 92b of the MOSFET, and current sensors 108a and 108b which detect magnitudes and directions of currents of Schottky barrier diodes 93a and 93b, and current sensors 109a and 109b which detect magnitudes and directions of currents of PiN diodes 94a and 94b may be connected. In this case, when a voltage is calculated by focusing the division characteristic of only the current which flows in a MOSFET and a parasitic diode of the MOSFET, therefore, correction accuracy can be improved.

Further, in the same way as that described in EMBODIMENT 1, under the conditions where temperatures of a semiconductor device change intensely, a temperature sensor which detects the temperature of the semiconductor device group, or that of each semiconductor device, is attached so as to calculate a voltage drop which is generated in the semiconductor device group by using the characteristic of the semiconductor device group at the detected temperature, that is, the function Fvon( ). By performing the above-mentioned, the accuracy is further improved.

Further, in the EMBODIMENTs 1 to 6, use of a MOSFET as a switching element is assumed; however, when a JFET is used as a switching element, a division current is generated between a freewheeling diode in the same way, therefore, the effect in the same level as that of the EMBODIMENTs 1 to 6 can be obtained.

Embodiment 7

Figure 21:
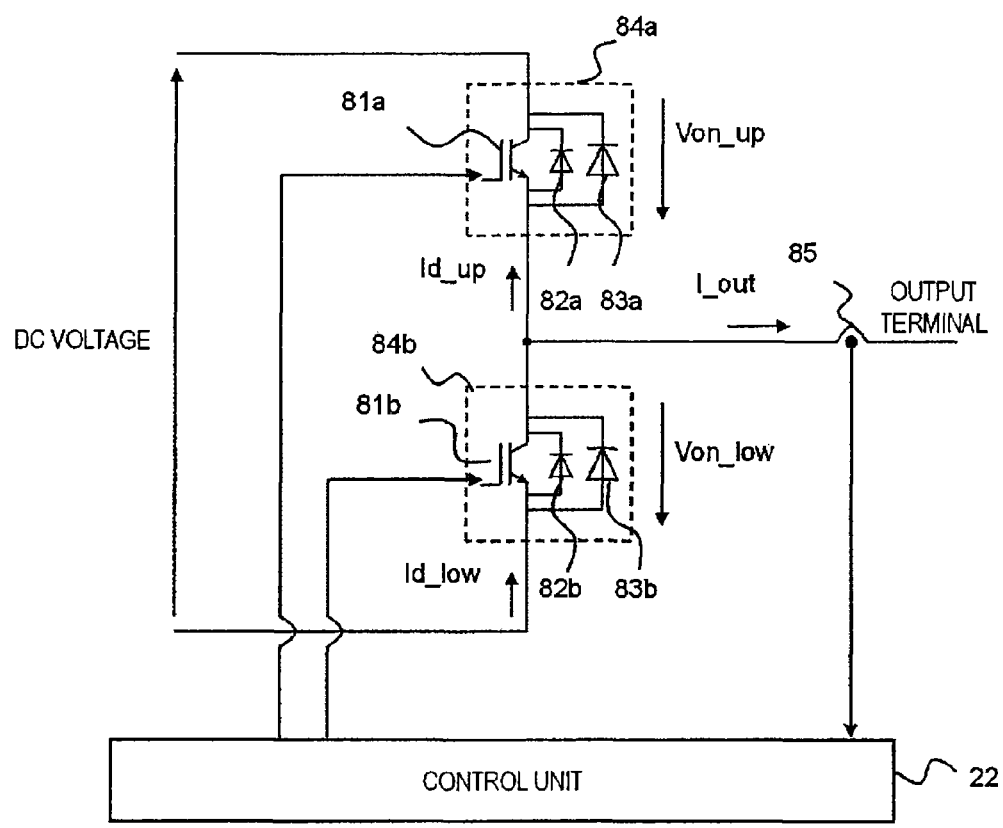
FIG. 21 is a circuit diagram showing a main circuit (leg) of a power converter device according to Embodiment 7 of the present invention.

FIG. 21 is a diagram showing a main circuit (leg) of a power converter device according to Embodiment 7 of the present invention. Basic configuration is same as that shown in FIG. 1 and FIG. 3. In EMBODIMENT 7, as shown in FIG. 21, when an upper arm is taken as an example, an IGBT 81a is used as a switching element of an output-side converter 2, a PiN diode 82a and a Schottky barrier diode 83a are used as freewheeling diodes, and the IGBT 81a, the PiN diode 82a, the Schottky barrier diode 83a constitute a semiconductor device group 84a. In a lower arm, a semiconductor device group 84b is constituted in the same way as that of the semiconductor device group 84a. The above-mentioned configuration is often used for the purpose such that the characteristic of a Schottky barrier diode which is more excellent than that of a PiN diode is utilized for an IGBT package in which a PiN diode is incorporated as a freewheeling diode.

In the above-mentioned configuration, the IGBTs 81a and 81b which are switching elements can not make the reverse current flow; therefore a division current is not generated between a switching element and a freewheeling diode. However, a division current is generated between a PiN diode and a Schottky barrier diode which are freewheeling diodes. Basic configuration of a control unit 22 is the same as that shown in FIG. 3, however, in the above-mentioned configuration of the semiconductor element group, a division path is between freewheeling diodes, therefore, following characteristic is given to a voltage drop calculating unit 32 in FIG. 3.

Figure 22:
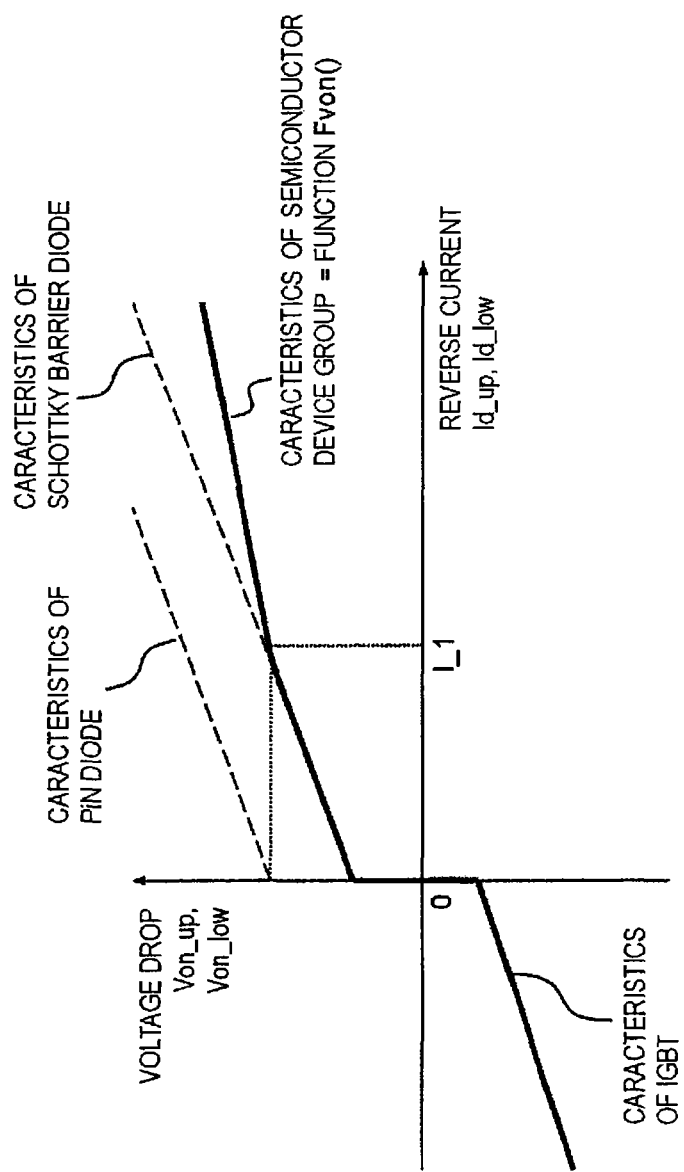
FIG. 22 is a diagram showing an example of voltage-drop characteristics including a division current characteristic of semiconductor device group according to Embodiment 7 of the present invention.

FIG. 22 shows an example of voltage drop-current characteristics of a IGBT, a PiN diode and a Schottky barrier diode, and a semiconductor device group, comprising the IGBT, the PiN diode and the Schottky barrier diode which are connected in parallel, at a certain temperature. In FIG. 22, in a case where a reverse current in a semiconductor device group which is an ON-state ((=Id_up or Id_low) is 0A or lower, a current flows only in the IGBT. On the other hand, in a case where a reverse current exceeds 0A, a current starts to flow in the Schottky barrier diode. Next, when a reverse current exceeds I__1, a current also starts to flow in the PiN diode, a division current is generated between the Schottky barrier diode and the PiN diode, and the characteristic, that is, an increase of a voltage drop with respect to current is further suppressed, is shown.

In the voltage drop calculating unit 32 in FIG. 3, the characteristic shown in FIG. 22 is incorporated as a table, as a mathematical equation, or as both of them, and the voltage drop V_on in a semiconductor device group is outputted. Finally, the V_on is added so as to correct the voltage command V_ref1, and the V_ref, which is final command, is derived. Based on the V_ref, ON/OFF control of a switching element in a semiconductor device group is performed.

In FIG. 22, an example in which a current flows in the order of an IGBT, a Schottky barrier diode and a PiN diode with respect to increase of reverse current. However, the order is not limited to the above, and there are some cases in which the order is different depending on individual characteristics.

As above-mentioned, even in a case where a semiconductor device group comprising an IGBT, a PiN diode and a Schottky barrier diode is used, according to EMBODIMENT 7, a voltage drop which is generated in the semiconductor device group is corrected. Consequently, an output voltage with high accuracy can be obtained, and a torque ripple can be decreased.

When there is an influence of dead-time, as described in EMBODIMENT 2, by incorporating a current path and the voltage drop characteristic in a semiconductor device group, an amount of a voltage drop which is generated in dead-time can be corrected. Consequently, an output voltage with higher accuracy can be obtained in EMBODIMENT 7.

In the above-mentioned, a current sensor 85 is provided so as to detect the output current I_out, in the same way as the description of the EMBODIMENTs, current sensors may be provided so as to directly detect the current Id_up which flows in a semiconductor device group 84a of an upper arm and the current Id_low which flows in a semiconductor device group 84b of a lower arm, respectively. Generally, the output current is I_out=−Id_up+Id_low and either the Id_up or the Id_low is zero. However, in a case where a leakage current when an IGBT is an OFF-state is not be negligible, accuracy can be improved by using two current sensors.

Further, in order to directly detect a current which flows in each semiconductor device including an IGBT and a freewheeling diode constituting a semiconductor device group, current sensors which detect magnitudes and directions of currents which flow in IGBTs 81a and 81b as switching elements, and current sensors which detect magnitudes and directions of currents which flow in Schottky barrier diodes 83a and 83b may be connected. In this case, a voltage may be calculated by using only the characteristic of each semiconductor device while focusing on the current which flows in each semiconductor device, therefore, correction accuracy can be improved.

Further, under the conditions where temperatures of a semiconductor device change intensely, a temperature sensor which detects the temperature of the semiconductor device group, or that of each semiconductor device, is attached so as to calculate a voltage drop which is generated in the semiconductor device group by using the characteristic of the semiconductor device group at the detected temperature, that is, the function Fvon( ). By performing the above-mentioned, the accuracy is further improved.

Embodiment 8

Figure 23:
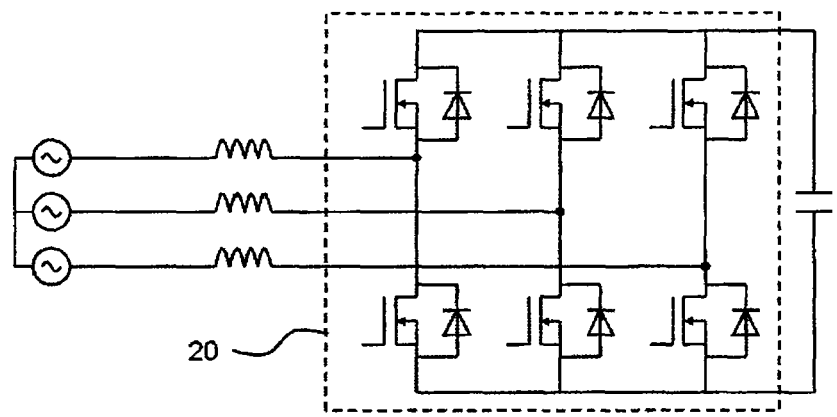
FIG. 23 is a circuit diagram showing another example of configuration of a power unit to which a power converter device according to the present invention is applied.
Figure 24:
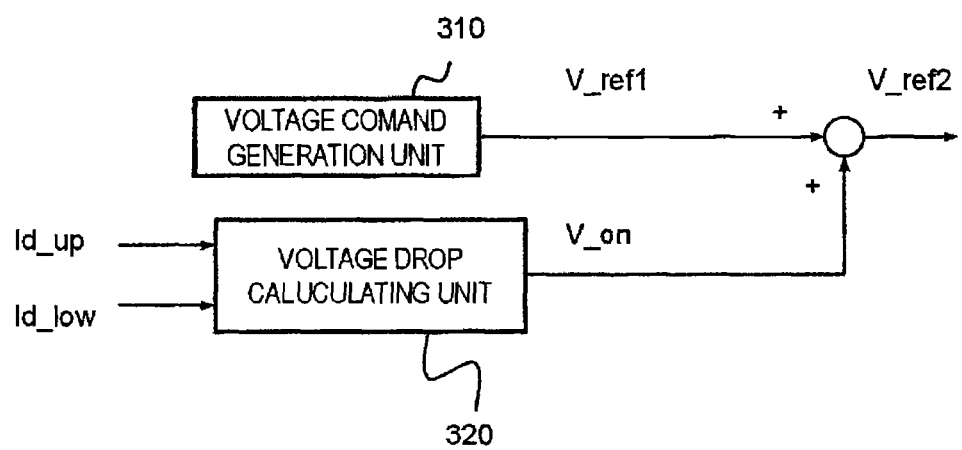
FIG. 24 is a block diagram, showing a control unit in a case where a power converter device of the present invention is applied to a power unit shown in FIG. 23.

In the EMBODIMENTs 1 to 7, an example in which a power converter device according to the present invention is used as an adjustable-speed motor driving device is shown; however a power converter device according to the present invention can be used as a power converter device 20 which is connected to an electric power system as shown in FIG. 23. In this case, a system current is main object to be controlled; therefore, the voltage command V_ref1 which is generated in a voltage command generation unit 310 in FIG. 24 is generated so as to control the system current. For example, in a case where an input-side converter 1 of a power unit is replaced with a power converter device 20, a DC voltage is made to be a certain constant value, therefore, the voltage command generation unit 310 generates the voltage command V_ref1 so as to make an active current a suitable value. Concretely, the V_ref1 is generated by pq control, etc. Also in this case, a voltage drop calculating unit 320 calculates a voltage drop in a semiconductor device group in the same way as that described in the EMBODIMENTs 1 to 7.

Embodiment 9

A switching element and a diode element in the EMBODIMENTs 1 to 8 may be formed of silicon, or may be formed of a wide-band gap semiconductor whose band-gap is bigger than that of silicon. Wide-band gap semiconductors include silicon carbide, gallium nitride, diamond, etc.

The switching element and the diode element which are formed of the wide-band gap semiconductors have a high withstand voltage property and a high allowable current density. Therefore, the switching element and the diode element can be miniaturized, by using the switching element and the diode element which are miniaturized, semiconductor modules in which the elements are incorporated can be miniaturized.

Further, the above-mentioned elements have also a high heat resistance, therefore, heat radiation fins of a heat sink can be miniaturized and a water-cooling part substituted with air cooling is possible. Consequently, further miniaturization of semiconductor modules is possible.

Further, power loss is low, therefore, higher efficiency of the switching element and the diode element can be achieved, and higher efficiency of semiconductor modules can be achieved.

Further, it is preferable that both of a switching element and a diode element are formed of a wide-band gap semiconductor, however, either element may be formed of a wide-band gap semiconductor, and the effect which is described in the EMBODIMENTs 1 to 8 can be obtained.

In EMBODIMENTs 1 to 8, a PWM control is described as an example, however, a control method is as long as a method for controlling a power voltage by using the ratio of ON/OFF of a switching element, other control methods can also be applied to the present invention. For example, the present invention can be applied to PDM (Pulse Density Modulation) which is a method for controlling a voltage by changing a density of a pulse having a constant width. In the PDM control, per control period which determines a pulse density with respect to a target voltage, an average value of the V_on is obtained by the ratio of ON/OFF, and then a pulse density of next control period may be determined. Basically, in a case of a PWM control, one on-period and one off-period exist in one control period; however, in a case of a PDM control, a plurality of on-periods and a plurality of off-periods exist in one control period. Consequently, in a case of a PDM control, the ratio of total of on-period and total of off-period is the ratio of ON/OFF, and by using the obtained ratio, an average value of the V_on is obtained.

DESCRIPTION OF THE REFERENCE CHARACTERS

21: leg
22: control unit
23a, 23b, 61a, 61b, 81a, 81b, 91a, 91b: switching element
24a, 24b, 62a, 62b, 92a, 92b: parasitic diode
25a, 25b, 64a, 64b, 84a, 84b, 95a, 95b: semiconductor device group
26, 29a, 29b, 65, 67a, 67b, 68a, 68b, 69a, 69b, 85, 96, 99a, 99b, 107a, 107b, 108a, 108b, 109a, 109b: current sensor
31, 310: voltage command generation unit
32, 320: voltage drop calculating unit
33: switching control unit
63a, 63b, 83a, 83b, 93a, 93b: Schottky barrier diode
82a, 82b, 94a, 94b: PiN diode
Td: dead-time
Tsw: switching half period

The invention claimed is:

1. A power converter device comprising:
a leg including two semiconductor device groups which are connected in series, and the each semiconductor device group includes a switching element and a semiconductor element other than the switching element which are connected in parallel, a connecting point to which the semiconductor device groups are connected in series is an AC terminal, and both ends of the leg are DC terminals so that a current which flows in the each semiconductor device group includes a first division current that flows through the switching element and a second division current that flows through the semiconductor element other than the switching element in the each semiconductor device group;
a current sensor which detects the current which flows in the each semiconductor device group;
a voltage command generation unit which calculates a voltage command value to be outputted;
a voltage drop calculating unit which calculates a voltage drop of the each semiconductor device group by using a current value which is detected by the current sensor and voltage drop characteristics including a division current characteristic of the each semiconductor device group; and
a switching control unit which corrects the voltage command value which is generated by the voltage command generation unit by using the voltage drop which is calculated by the voltage drop calculating unit so as to control ON/OFF of the each switching element.

2. The power converter device as claimed in claim 1, wherein the voltage drop calculating unit calculates the voltage drop in n times-period of switching half period (n is positive integer) by using the current value which is detected by the current sensor, the switching control unit controls ON/OFF of the each switching element by using the voltage drop which is calculated by the voltage drop calculating unit and correcting the voltage command value which is generated by the voltage command generation unit as the voltage command value in m times-period (m is positive integer) which is later than n-times period of the switching half period.

3. The power converter device as claimed in claim 2, wherein the current sensor is provided so as to detect a current which flows in the AC terminal, the voltage drop calculating unit calculates respective voltage drops in two semiconductor device groups in a leg by using a current value which is detected by the current sensor and ON-time ratio of the respective semiconductor device groups which are outputted by the switching control unit with respect to n-times period of switching half period.

4. The power converter device as claimed in claim 2, wherein the current sensor is provided so as to detect the current which flows in respective semiconductor device groups of two semiconductor device groups in the leg, and respective voltage drops in two semiconductor device groups in the leg are calculated by using the current value of the current which flows in respective semiconductor device groups.

5. The power converter device as claimed in claim 1, wherein the voltage drop calculating unit calculates the voltage drop based on the division current characteristic of the each semiconductor device group which is made to be a characteristic in which a current does not flow in the switching element during a dead time period.

6. The power converter device as claimed in claim 1, wherein, the switching elements are MOSFETs or JFETs, the semiconductor elements other than the switching elements are parasitic diodes which accompany the MOSFETs or the JFETs, and the device is configured so as to perform synchronous rectification.

7. The power converter device as claimed in claim 6, wherein freewheeling diodes are further connected as the semiconductor elements other than the switching elements.

8. The power converter device as claimed in claim 7, wherein the semiconductor elements other than the switching elements are formed of wide-band gap semiconductor material.

9. The power converter device as claimed in claim 8, wherein the wide-band gap semiconductor material is silicon carbide, gallium nitride or diamond.

10. The power converter device as claimed in claim 1, wherein the switching elements are formed of wide-band gap semiconductor material.

11. The power converter device as claimed in claim 10, wherein the wide-band gap semiconductor material is silicon carbide, gallium nitride or diamond.

12. The power converter device as claimed in claim 1, wherein the division current characteristic is based on a voltage drop-current characteristic of the switching element when the first division current flows through the switching element and a voltage drop-current characteristic of the semiconductor element other than the switching element when the second division current flows through the semiconductor element other than the switching element.

13. The power converter device as claimed in claim 1, wherein the switching element and the semiconductor element other than the switching element in a same semiconductor device group are configured to conduct current at a same time.

14. A driving method of a power converter device wherein the power converter device is configured such that in a leg comprising two semiconductor device groups which are connected in series, and the each semiconductor device group includes a switching element and a semiconductor element other than the switching element which are connected in parallel, a connecting point to which the semiconductor device groups are connected in series is an AC terminal, both ends of the leg are DC terminals, and a current which flows in the each semiconductor device group includes a first division current that flows through the switching element and a second division current that flows through the semiconductor element other than the switching element in the each semiconductor device group, the method comprising:

calculating a voltage command value to be outputted;

calculating a voltage drop of the each semiconductor device group by using a value of the current which flows in the each semiconductor device group and voltage drop characteristics including a division current characteristic of the each semiconductor device group; and correcting the voltage command value by using the voltage drop which is calculated so as to control ON/OFF of the each switching element.

15. The driving method of a power converter device as claimed in claim 14, further comprising:

determining the division current characteristic based on a voltage drop-current characteristic of the switching element when the first division current flows through the switching element and a voltage drop-current characteristic of the semiconductor element other than the switching element when the second division current flows through the semiconductor element other than the switching element.

16. The driving method of a power converter device as claimed in claim 14, wherein the voltage drop in n times-period of switching half period (n is positive integer) is calculated by using the value of the current which flows in the each semiconductor device group, and the voltage command value, which is calculated as the voltage command value in m times-period of switching half period (m is positive integer) which is later than n-times period of the switching half period, is corrected by using the voltage drop which is calculated so as to control ON/OFF of the each switching element.

17. The driving method of a power converter device as claimed in claim 16, wherein the respective voltage drops in two semiconductor device groups in a leg are calculated by using a value of a current which flows in the AC terminal and ON-time ratio of the respective semiconductor device groups with respect to n-times period of switching half period.

18. The driving method of a power converter device as claimed in claim 14, wherein the semiconductor device groups are controlled so as to perform synchronous rectification.

19. The driving method of a power converter device as claimed in claim 14, further comprising:

conducting the first division current in the switching element at a same time as conducting the second division current in the semiconductor element other than the switching element of the same semiconductor device group.

20. A power converter device comprising:

a leg including two semiconductor device groups which are connected in series, and each semiconductor device group includes a switching element, a first semiconductor element other than the switching element, and a second semiconductor element other than the switching element which are connected in parallel, a connecting point to which the semiconductor device groups are connected in series is an AC terminal, and both ends of the leg are DC terminals so that a current which flows in each semiconductor device group includes a first division current that flows through the first semiconductor element other than the switching element and a second division current that flows through the second semiconductor element other than the switching element;

a current sensor which detects the current which flows in the semiconductor device group;

a voltage command generation unit which calculates a voltage command value to be outputted;

a voltage drop calculating unit which calculates a voltage drop of each semiconductor device group by using a current value which is detected by the current sensor and voltage drop characteristics including a division current characteristic of each semiconductor device group; and a switching control unit which corrects the voltage command value which is generated by the voltage command generation unit by using the voltage drop which is calculated by the voltage drop calculating unit so as to control ON/OFF of each switching element.

\* \* \* \* \*